US009950260B2

(12) United States Patent
Kawano et al.

(10) Patent No.: US 9,950,260 B2
(45) Date of Patent: Apr. 24, 2018

(54) GAME SYSTEM CAPABLE OF DISPLAYING COMMENTS, COMMENT DISPLAY CONTROL METHOD, AND COMPUTER READABLE STORAGE MEDIUM

(71) Applicant: Konami Digital Entertainment Co., Ltd., Minato-ku (JP)

(72) Inventors: Yoshiaki Kawano, Minato-ku (JP); Kenichi Yamamoto, Minato-ku (JP); Masakazu Shibamiya, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 743 days.

(21) Appl. No.: 14/548,165

(22) Filed: Nov. 19, 2014

(65) Prior Publication Data

US 2015/0072788 A1 Mar. 12, 2015

Related U.S. Application Data

(63) Continuation of application No. PCT/JP2013/063289, filed on May 13, 2013.

(30) Foreign Application Priority Data

May 31, 2012 (JP) .................................. 2012-125234

(51) Int. Cl.
*A63F 13/87* (2014.01)
*A63F 13/53* (2014.01)
*A63F 13/577* (2014.01)

(52) U.S. Cl.
CPC ............ *A63F 13/53* (2014.09); *A63F 13/577* (2014.09); *A63F 2300/303* (2013.01);
(Continued)

(58) Field of Classification Search
CPC .......... A63F 13/50; A63F 13/53; A63F 13/55; A63F 13/56; A63F 13/87; A63F 2300/308; A63F 2300/408
(Continued)

(56) References Cited

U.S. PATENT DOCUMENTS

| 5,935,002 A * | 8/1999 | Falciglia | ................ G07F 17/32 273/143 R |
| 5,971,849 A * | 10/1999 | Falciglia | ................ G07F 17/32 273/292 |

(Continued)

FOREIGN PATENT DOCUMENTS

| JP | 2533397 B2 | 9/1996 |
| JP | 10-201955 A | 8/1998 |

(Continued)

OTHER PUBLICATIONS

Korean Office Action with English Translation (Korean Application No. 10-2014-7031618); dated Jan. 29, 2017.
(Continued)

*Primary Examiner* — Michael Cuff
(74) *Attorney, Agent, or Firm* — Howard & Howard Attorneys PLLC

(57) ABSTRACT

There is provided a game system capable of displaying appropriately a comment while suppressing decrease of visibility of a game screen. The game system includes a game apparatus allowing a user to play a game, and displays, on the game apparatus, comments to the user on the game screen to be displayed according to game status, wherein areas inappropriate for comment display on the game screen are determined as display restricted areas, and in each display restricted area, by hiding the comment for example, a predetermined restriction is applied to the comment display in the display restricted area.

8 Claims, 14 Drawing Sheets

(52) U.S. Cl.
CPC ..... *A63F 2300/308* (2013.01); *A63F 2300/55* (2013.01); *A63F 2300/572* (2013.01)

(58) Field of Classification Search
USPC .......................................................... 463/31
See application file for complete search history.

(56) References Cited

U.S. PATENT DOCUMENTS

| | | | |
|---|---|---|---|
| 6,542,155 B1 | 4/2003 | Mifune et al. | |
| 6,603,479 B1 | 8/2003 | Mifune et al. | |
| 6,755,743 B1* | 6/2004 | Yamashita | A63F 13/005 463/40 |
| 8,456,721 B2* | 6/2013 | Arimura | G06T 11/001 358/1.9 |
| 8,760,469 B2* | 6/2014 | Roberts | H04N 21/4788 345/473 |
| 8,767,033 B2* | 7/2014 | Sampathkumaran | H04N 21/4788 345/419 |
| 2003/0032483 A1 | 2/2003 | Mifune et al. | |
| 2003/0101450 A1* | 5/2003 | Davidsson | G06Q 10/10 725/32 |
| 2004/0198497 A1 | 10/2004 | Yamashita et al. | |
| 2004/0198498 A1 | 10/2004 | Yamashita et al. | |
| 2005/0209008 A1 | 9/2005 | Shimizu et al. | |
| 2010/0217798 A1 | 8/2010 | Asami | |
| 2011/0059801 A1* | 3/2011 | Shiigi | A63F 13/812 463/42 |
| 2012/0189272 A1* | 7/2012 | Kunigita | H04N 21/4788 386/239 |
| 2013/0130794 A1 | 5/2013 | Oshima et al. | |

FOREIGN PATENT DOCUMENTS

| | | |
|---|---|---|
| JP | 3529138 B2 | 5/2004 |
| JP | 3934649 B2 | 6/2007 |
| JP | 2008293191 A | 12/2008 |
| JP | 4252608 B2 | 4/2009 |
| JP | 2010082335 | 4/2010 |
| JP | 2010-131082 A | 6/2010 |
| JP | 2011-005306 A | 1/2011 |
| JP | 2012-034792 A | 2/2012 |
| KR | 1020060025804 | 3/2006 |

OTHER PUBLICATIONS

International Search Report; PCT/JP2013/063289; dated Aug. 13, 2013.
Japanese Office Action with English Translation; Design Application No. 2012-125234; dated Aug. 6, 2013.

* cited by examiner

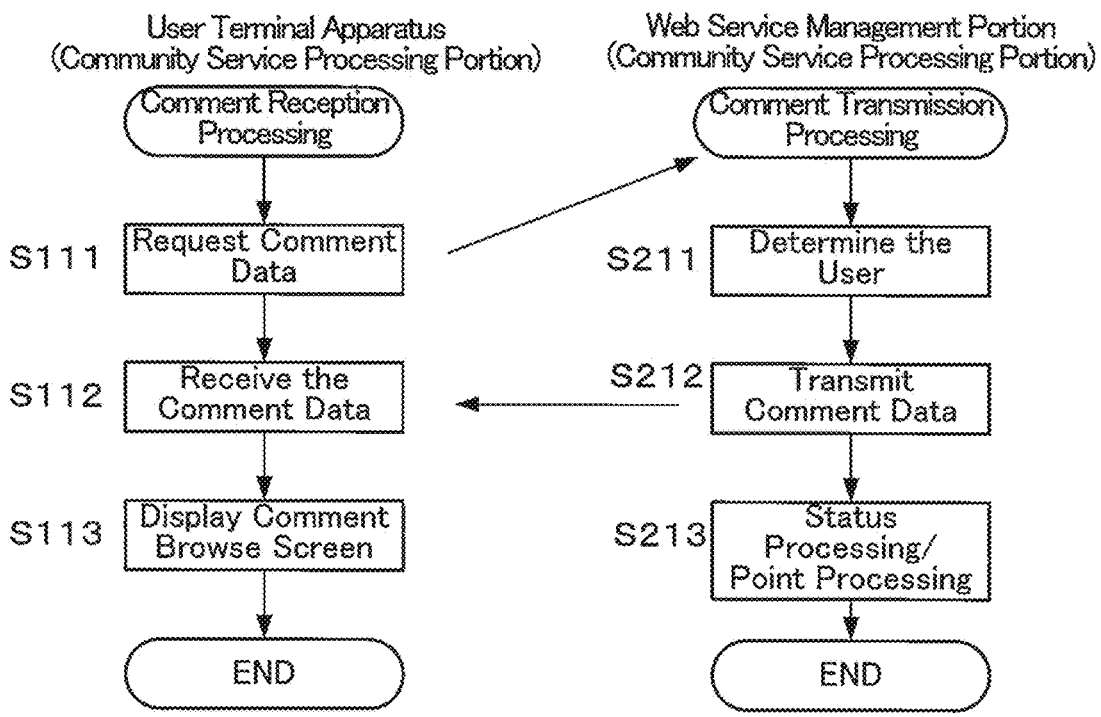
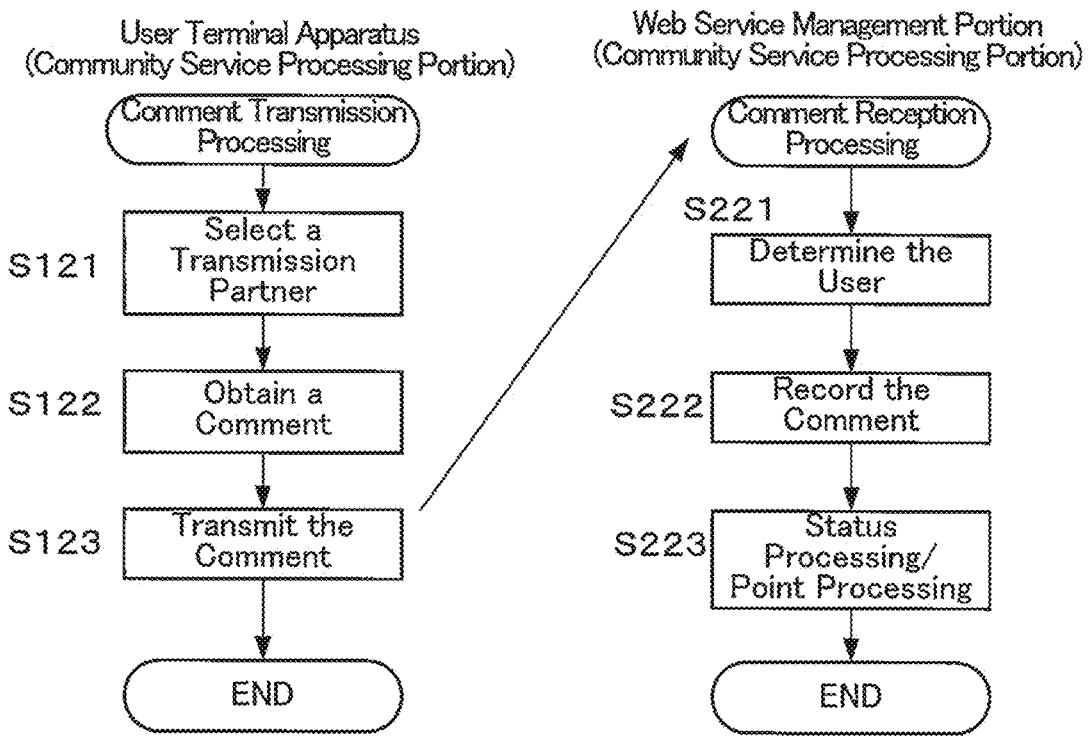

GAME SYSTEM CAPABLE OF DISPLAYING COMMENTS, COMMENT DISPLAY CONTROL METHOD, AND COMPUTER READABLE STORAGE MEDIUM

CROSS REFERENCE TO RELATED APPLICATION

This application is a continuation of PCT/JP2013/063289, filed May 13, 2013, which claims priority to Japanese Patent Application No. 2012-125234, filed May 31, 2012, the disclosures of which are hereby incorporated by reference in their entirety.

TECHNICAL FIELD

The present invention relates to a game system provided with a function of displaying comments on a game screen.

BACKGROUND ART

As a system for realizing communication between users via a network, network service which is typified by the SNS (standing for the Social Network Service) has prevailed broadly. The field of game system is not an exception. For example, suggested is a game system capable of exchanging comments between game machines for home use which are connected with the network (for example, see the patent literature 1). Also suggested is a game system which realizing pseudo communication by selectively sending and receiving lines appropriate for game statuses between game machines for commercial use which are connected with the network (for example, see the patent literature 2).

CITATION LIST

Patent Literature

PTL1: JP-A-2011-005306 and PTL2: JP-A-2010-131082.

SUMMARY OF INVENTION

Technical Problem

On the game screen, displayed are various kinds of display elements such as objects which users should constantly recognize during game-play. Therefore, if the comments are displayed on the game screen randomly, as the visibility of the game screen is impaired, the comments would interrupt the game-play, and there is a possibility that the interest in the game decreases.

Then, the present invention aims to provide a game system and the like which are capable of appropriately displaying comments while suppressing decrease of visibility of the game screen.

Solution to Problem

A game system as one aspect of the present invention is a game system: including a game apparatus which allows a user to play a game; and having a comment display controlling device which is configured to, when computer code is executed by a computer apparatus of the game apparatus, display a comment for the user on a game screen to be displayed according to a status of the game, the comment display controlling device being provided with: an area determining device which is configured to, when computer code is executed by the computer apparatus, determine an area inappropriate for display of the comment in the game screen as a display restricted area; and a display restricting device which is configured to, when computer code is executed by the computer apparatus, apply a predetermined restriction to the display of the comment in the display restricted area.

Further, a comment display control method as one aspect of the present invention is a comment display control method applied to a game system including a game apparatus which has a computer apparatus and allows a user to play a game, the comment display control method for controlling the computer apparatus to display a comment for the user on a game screen to be displayed according to a status of the game, including: an area determining step of determining an area inappropriate for display of the comment on the game screen as a display restricted area; and a display restricting step of applying a predetermined restriction to the display of the comment in the display restricted area.

According to the present invention, the area which is inappropriate for comment display is determined as the display restricted area, and according to this determination result, a predetermined restriction is applied to the comment display in the display restricted area. Accordingly, when the determination criterion of the area determining device is set so that an area where an intolerant degree problem could occur on the visibility of game-play if a comment is displayed is determined as the display restricted area, and the restriction is set so that the visibility necessary for game-play is ensured, it is possible to display the comment appropriately using an area other than the display restricted area, while suppressing decrease of visibility of the game screen.

In the present invention, anything the semantic content of which can be grasped or comprehended by a user using visual sense can be employed as the "comment". As long as the thing can be comprehended in such a way, even if the thing is represented as "message" or the other something, the thing is included in the conception of the "comment". As one example, the "comment" may be a comment transmitted to the user of the game apparatus from another user. Further, the "comment" is not only limited to an example composed of only letters, but also may be the one including graphic elements, such as pictographs and symbols, in at least a part thereof.

In one embodiment of the present invention, the display restricted area may include a dynamic area where a shape or a size of the dynamic area is changed according to the status of the game, and the area determining device may be configured to determine the dynamic area based on the status of the game. According to this embodiment, it is possible to restrict the comment display according to the change of the dynamic area according to the status of the game.

In one embodiment of the present invention, the comment display controlling device may be configured to display a window for comment display on the game screen and display a content of the comment in the window, and the display restricting device may be configured to set a display position of the window so as to avoid the display restricted area to realize the predetermined restriction. According to this, as the window is displayed on the game screen while avoiding the display restricted area, it is possible to exclude a problem that the visibility of the game screen is decreased due to the comment display.

In one embodiment of the present invention, the comment display controlling device may be configured to display the comment moving on the game screen, and the display restricting device may be configured to apply the predetermined restriction when the comment moving overlaps with the display restricted area. According to this embodiment, when at least a part of the comment moving is overlapped with the display restricted area, the restriction is applied to the comment display. Thereby, it is possible to display the comment apparently using an area other than the display restricted area, while suppressing decrease of visibility of the game screen.

Further, the display restricting device may be configured to make visibility of a part where the comment is overlapped with the display restricted area lower than visibility of another display element to be displayed on the display restricted area, to apply the predetermined restriction. Thereby, it is possible to display the comment appropriately, while suppressing decrease of visibility of the other element in the display restricted area.

Further, the display restricting device may be configured so as not to display the part where the comment is overlapped with the display restricted area on the game screen, to apply the predetermined restriction (as one example, FIG. 15). Alternatively, the display restricting device may be configured to control the display of the comment so that the comment moves avoiding the display restricted area, to apply the predetermined restriction (as one example, FIG. 16). According to the above embodiments, it is possible to exclude a problem that the visibility of the display element displayed in the display restricted area is decreased by the comment.

Effects of Invention

As described above, according to the present invention, an area inappropriate for comment display in a game screen is determined as a display restricted area, and according to this determination result, a predetermined restriction is applied to the comment display in the display restricted area. Because of this, when an area where an intolerant degree problem could occur on the visibility of game-play if a comment is displayed is determined as the display restricted area, and the display of the comment in the display restricted area is restricted, it is possible to display the comment appropriately using an area other than the display restricted area while suppressing decrease of visibility of the game screen.

BRIEF DESCRIPTION OF DRAWINGS

FIG. 10 is a flow chart showing procedures of processing to be executed for receiving a comment on the user terminal apparatus.

FIG. 11 is a flow chart showing procedures of processing to be executed for transmitting a comment on the user terminal apparatus.

DESCRIPTION OF EMBODIMENTS

First Embodiment

Hereinafter, a game system according to a first embodiment of the present invention will be described. First, in reference to FIG. 1, an entire configuration of the game system will be described. The game system 1 includes a center server 2 as a server apparatus, and game machines (corresponding to game apparatuses) 3 and user terminal apparatuses 4 as client apparatuses capable of connecting to the center server 2 via a predetermined network. The center server 2 is configured as a single logical server apparatus by combining plural server units 2A, 2B . . . . However, the center server 2 may be configured by a single server unit. Alternatively, the center server 2 may be logically configured by using the cloud computing.

Figure 1:
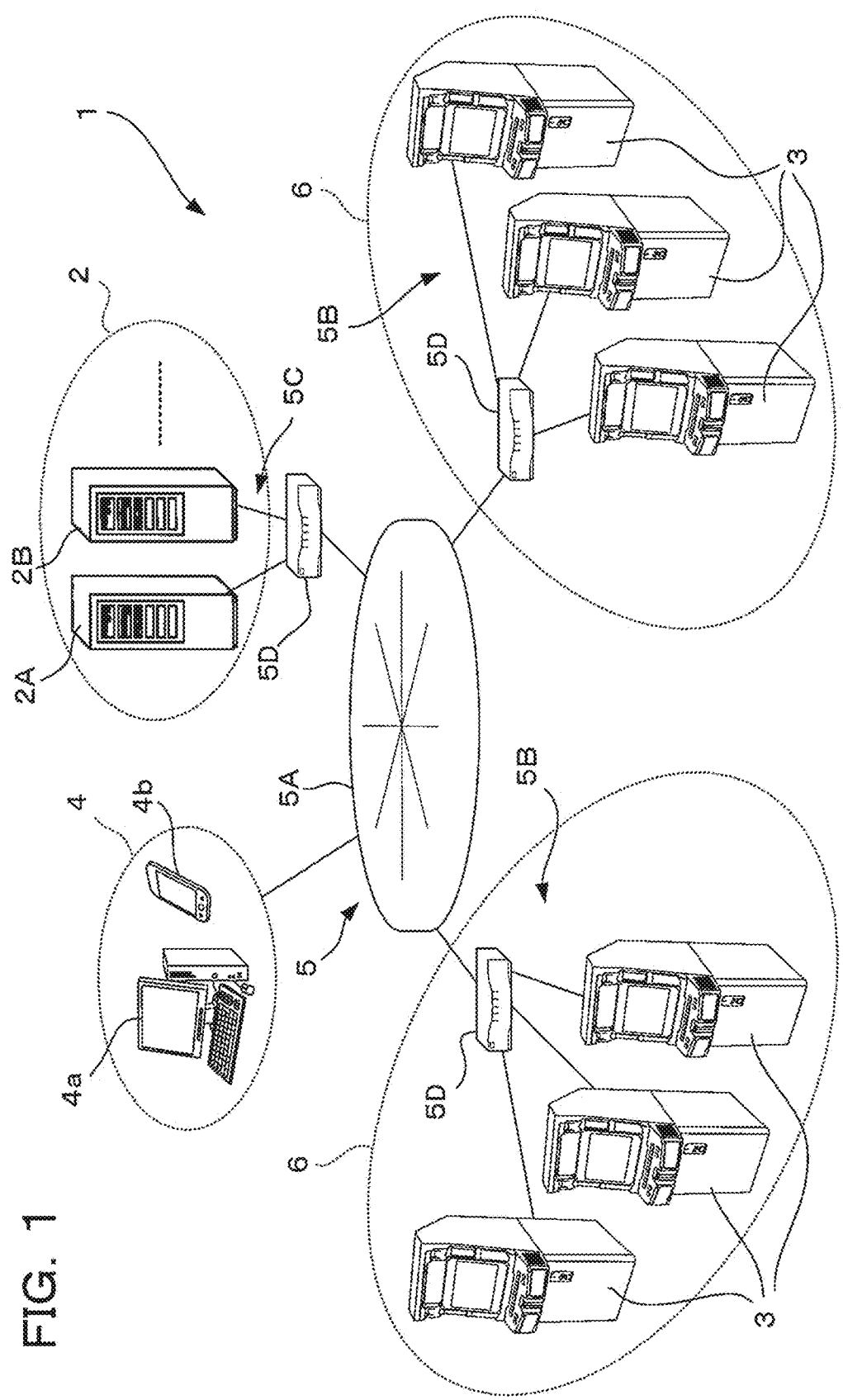
FIG. 1 is a diagram showing an entire configuration of a game system according to a first embodiment of the present invention.

The game machine 3 is configured as a game machine for commercial use (business use) which allows, in exchange of payment of predetermined game-play charge, a user to play a game in a range corresponding to the game-play charge. This type of game machine 3 is sometimes called an arcade game machine. The game machine 3 is a computer game apparatus to be installed to a predetermined facility such as a store 6 mainly for generating revenue by making a lot of users play games repeatedly. To each store 6, one or the appropriate number of game machines 3 are installed. In FIG. 1, the game machines 3 are illustrated without distinction. However, the hardware configuration and the game content may be selected appropriately. The game machine 3 may be configured as a dedicated machine which has a physical structure (for example, an operation portion or the like) fitting a specific game, or may be configured as a general-purpose machine which is capable of treating various games by rewriting software.

While, the user terminal apparatus 4 is a computer apparatus which is capable of connecting to the network and is used by a user for his/her personal purpose. For example, a stationary type or a notebook type personal computer (hereinafter, referred to as the "PC") 4*a*, or a mobile terminal apparatus 4*b* like a portable phone (including a smart phone) can be used as the user terminal apparatus 4. In addition, various kinds of computer apparatuses which are capable of connecting to the network and are used for user's personal use, such as a stationary game machine for home use, a portable game machine, and a portable tablet terminal apparatus, may be used as the user terminal apparatuses 4. The user terminal apparatus 4 is capable of making a user receive various kinds of services to be provided by the center server 2 by implementing various kinds of computer software.

A network 5 may be configured appropriately depending on situations as long as the network 5 connects each of the game machine 3 and the user terminal apparatus 4 to the center server 2. As one example, the network 5 is configured to realize network communication using the TCP/IP protocol. Typically, the network 5 is configured by connecting via routers 5D, the internet 5A as a WAN to LANs 5B and 5C for connecting the game machine 3 and the center server 2 to the internet 5A respectively. The user terminal apparatus 4 is also appropriately configured to be connected with the internet 5A. Additionally, by providing a local server between the game machine 3 and the router 5D of the store 6, and the game machine 3 may be communicably connected to the center server 2 via the local server. The server units 2A, 2B, . . . of the center server 2 may be connected to each other by the WAN 5A in place of, or in addition to the LAN 5C.

Figure 2:
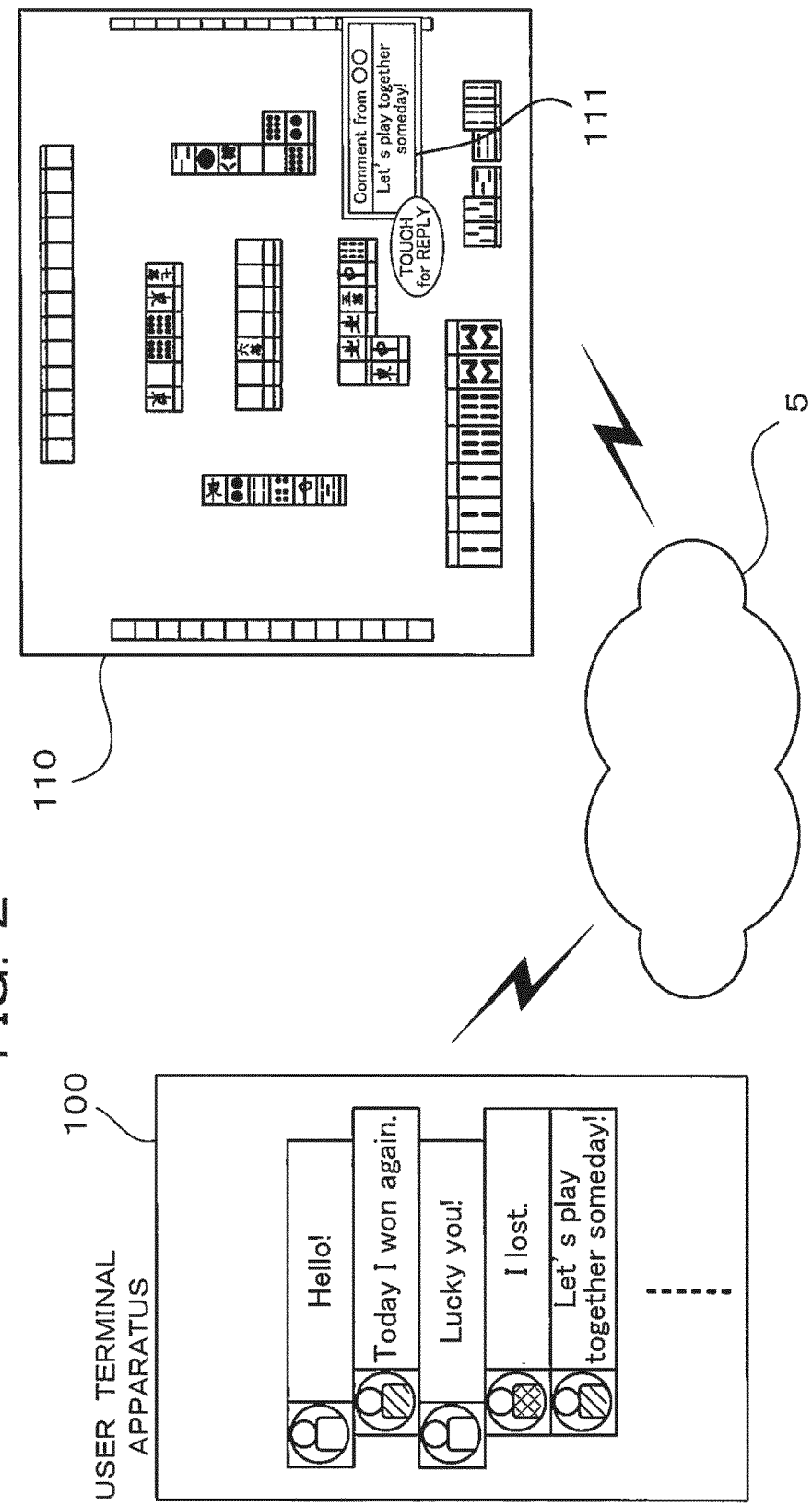
FIG. 2 is a diagram showing an outline of communication in the game system of the first embodiment.

Next, in reference to FIG. 2, the outline of a communication function realized in the game system 1 will be described. In the game system 1, users can form a community on the network, and the users belonging to the community can receive service that the users transmit, share, or exchange information by exchanging their comments and the like between the game machine 3 and the user terminal apparatus 4, or between the user terminal apparatuses 4. Such service is collectively called a community service. Especially, the function relating to comment exchange between the users is called a comment function. FIG. 2 shows a state that comments are exchanged based on the comment function. A browse screen 100 of comments is displayed on the user terminal apparatus 4. The browse screen 100 is similar to a browse screen which is used in a publicly known communication service such as the SNS (which stands for the Social Networking Service), where comments transmitted and received by users are displayed in a thread form. On the other hand, a comment window 111 is displayed on a game screen 110 of the game machine 3. In the comment window 111, a comment transmitted from the user terminal apparatus 4 is displayed by a predetermined procedure.

The game machine 3 is provided with, as an input device, a touch panel which covers the game screen 100. In the comment window 111, a message that there is a comment newly transmitted from the other user is notified, and when a user performs a touch operation to the message on the comment window 111, the content of the comment is displayed in the window 111. When the user performs a touch operation to the window 111 where the comment is displayed, a comment registered in advance is sent back to the user who transmitted the original comment. The reason why the comment registered in advance is sent back is that it is difficult that the user inputs his/her comment word by word in the middle of playing a game on the game machine 3. The comment window 111 is displayed as a pop-up window when the game machine 3 obtains a comment. The position where the comment window 111 is displayed is controlled so as not to obstruct the game-play. This point will be described later. In FIG. 2, the game screen 110 in the middle of executing a mah-jongg game is exemplified. However, the game to be executed on the game machine 3 may be selected appropriately.

Figure 3:
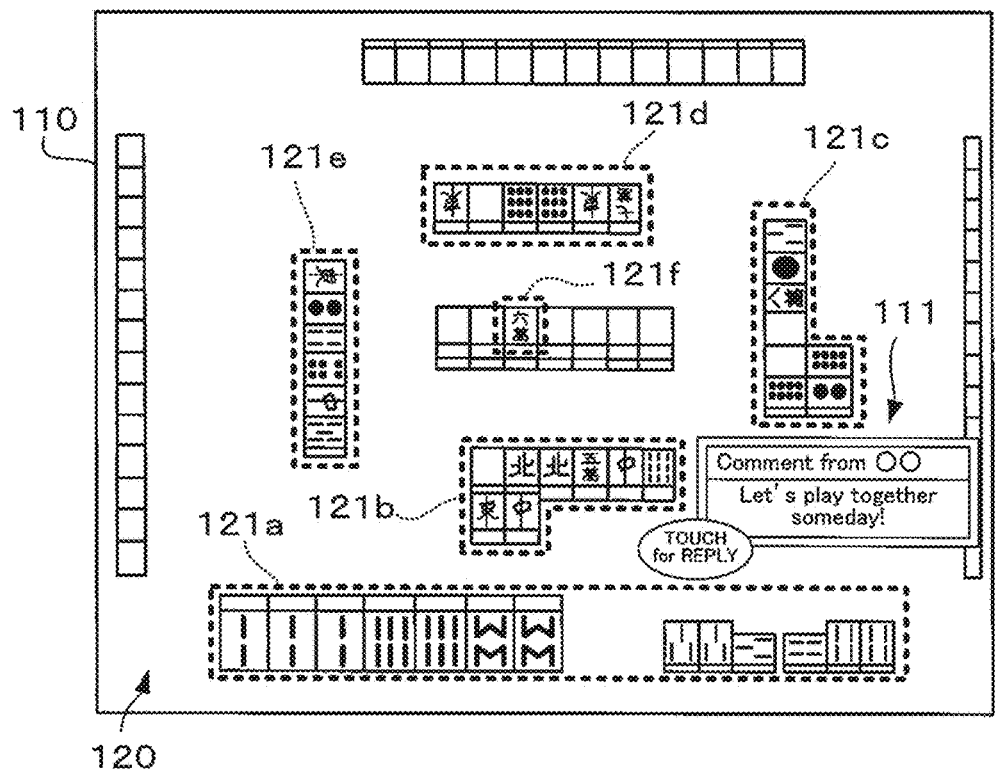
FIG. 3 is a diagram showing one example of a game screen in a four-player-play mode of a mah-jongg game.

As shown in FIG. 3, an area 120 appropriate for comment display and areas 121*a* to 121*f* inappropriate for comment display are set in the game screen 110 of the game machine 3. Hereinafter, the former area is called a display possible area, and the latter areas are called display restricted areas 121. An area where an intolerant problem could occur against the game-play will occur if a comment is displayed is set as the display restricted area 121. As one example, an area where information (including various kinds of display elements such as image and letters) which is indispensable to make a user recognize for his/her game-play is displayed is set as the display restricted area 121. In the display restricted area 121, a predetermined restriction is applied to comment display. In the example of FIG. 3, the comment window 111 is displayed on the game screen 110 so as to keep away from the display restricted areas 121. Thereby, the restriction is applied so that no comment is displayed in the display restricted areas 121. The display possible area 120 is an area other than the display restricted areas 121 of the game screen 110. In the figure, though the display restricted area 121 is surrounded by a dashed rectangular, the dashed part is not displayed in an actual game screen 110.

The display restricted area 121 may be set depending on the game content as appropriate. As one example, in the game screen 110 for the mah-jongg game shown in FIG. 3, the areas where tiles which should be recognized by the user during the competition are displayed, that are, the area 121*a* where hand tiles of the user are displayed, the areas 121*b* to 121*e* where discarded tiles of the user and the other players are displayed, and the area 121*f* where "DORA" tiles are displayed, are set as the display restricted areas 121 respectively. As hand tiles of the players other than the user are hidden from the user to begin with, the hand tiles are included in the display possible area 120. In addition, areas for displaying information necessary to be confirmed during the game-play such as a score of each user may be included in the display restricted area 121.

At least one portion of the display restricted areas 121 is dynamic areas where the shape and size thereof are changeable according to status (progress status) of game. In a case of a mah-jongg game, the number of discarded tiles increases according to the progress of the competition. The number of "DORA" tiles might also increase. Accordingly, the areas 121*b* to 121*f* are dynamic areas where the shape or size thereof can be changed according to the progress of the competition. In addition, also with respect to the hand tiles, the arrangement of tiles changes depending on whether there is "NAKI" or not. Accordingly, the area 121*a* is also the dynamic area. During game-play of the mah-jongg game, the shape and size of the dynamic area are changed appropriately according to the status of the game.

Figure 4:
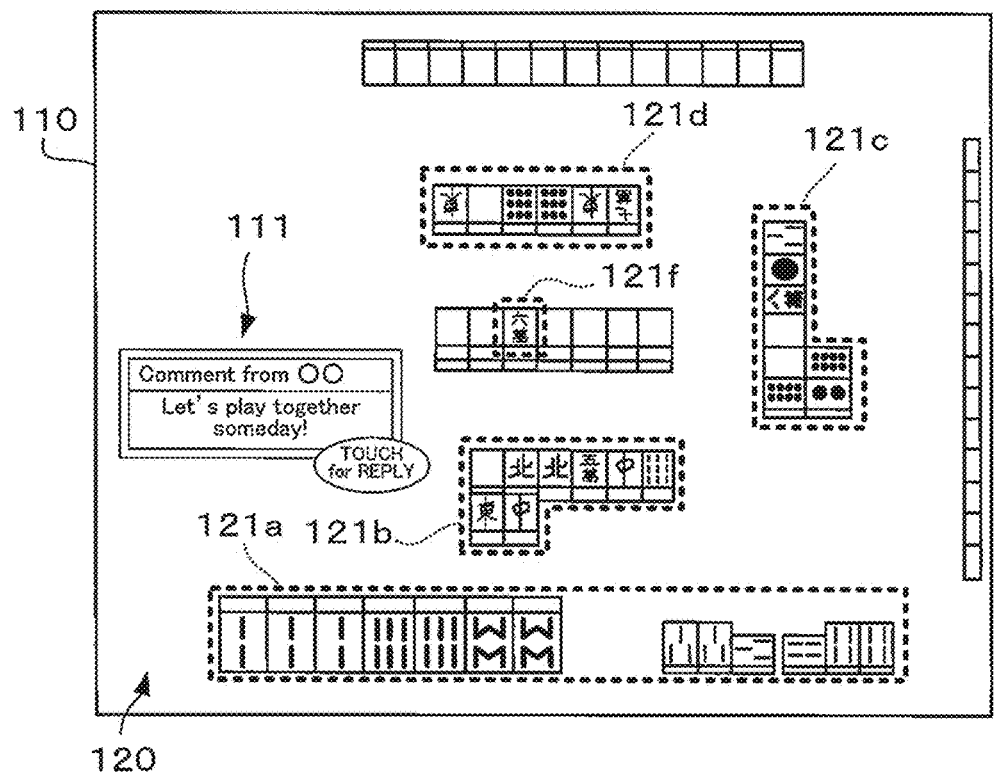
FIG. 4 is a diagram showing one example of a game screen in a three-player-play mode of a mah-jongg game.

In FIG. 3, shown is the game screen 110 in a mode that the mah-jongg game is played by four players. However, in the game machine 3, also prepared is another mode that the mah-jongg game is played by three players. Such competition mode is sometimes called the three-player-play or the "SANMA". FIG. 4 shows the game screen 110 of the three-player-play mode. In the game screen 110 shown in FIG. 4, displayed are the areas 121*b* to 121*d* for the hand tiles of only three players and the discarded tiles for only three players. Accordingly, in comparison to the game screen 110 of a four-player-play mode, the three-player-play mode lacks one area for one player with respect to the areas 121b to 121d where discarded tiles are displayed. Therefore, in the example of FIG. 4, there is the display possible area 120 comparatively wide on the left side of the game screen 110. In this way, basic structures of the game screen 110 are different from each other depending on the modes of the game, and the arrangement of the display possible area 120 and the display restricted areas 121 changes according to the difference in the basic structures. Accordingly, in order to set the display possible area 120 and the display restricted areas 121 according to the mode of the game screen 110, it is necessary to recognize both of the basic structure of the game screen 110 set for the mode and the game status.

Figure 5:
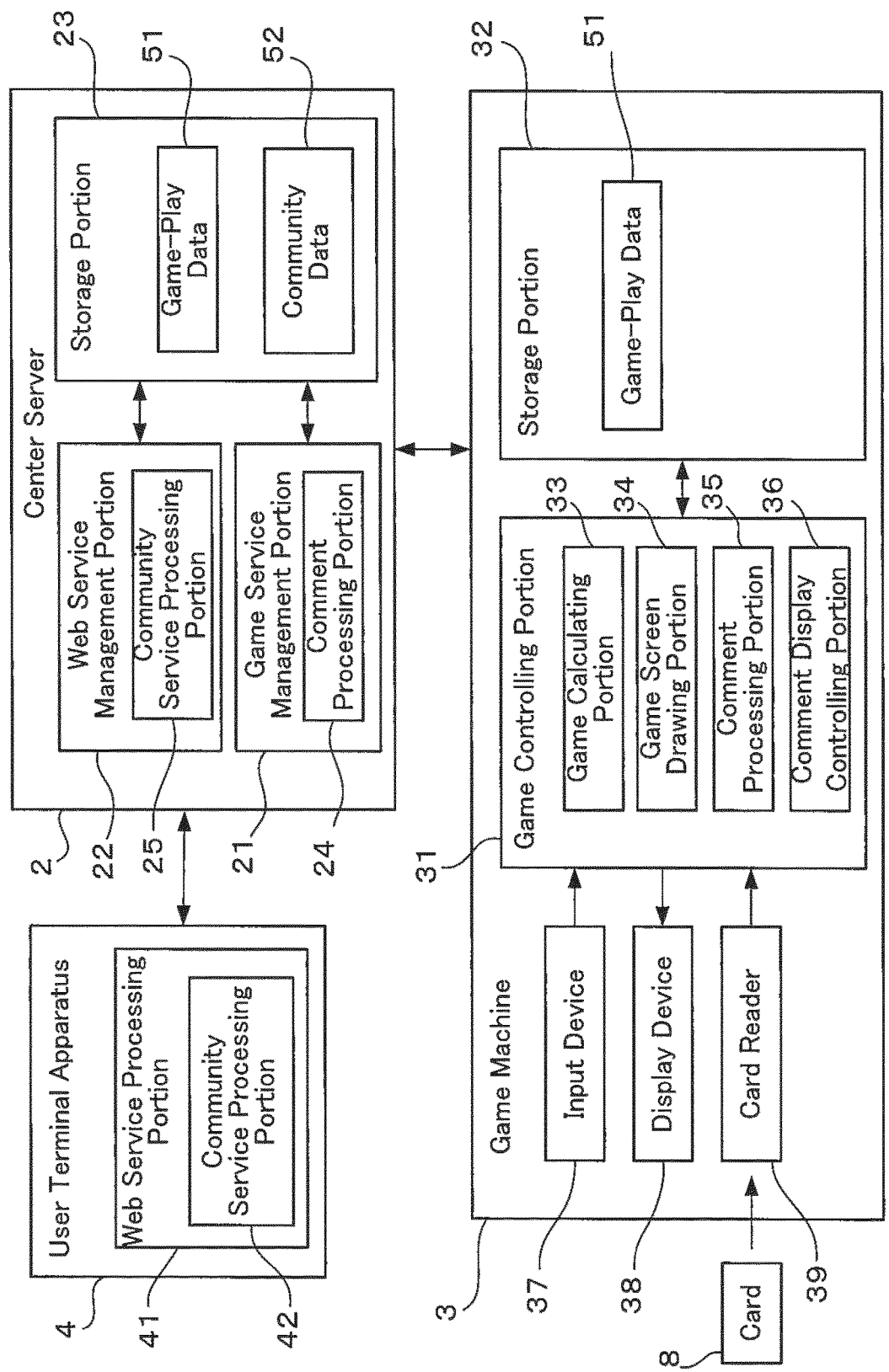
FIG. 5 is a functional block diagram with respect to main parts of the game system of the first embodiment.

FIG. 5 is a functional block diagram of main portions of the game system 1. The center server 2 is provided with a game service management portion 21, a Web service management portion 22 and a storage portion 23. Each of the management portions 21 and 22 is a logical device which is realized by a combination of computer hardware (including a CPU and memories as internal storage device necessary for operations of the CPU) of the center server 2 and software. The storage portion 23 is an external storage apparatus realized by a storage unit such as a hard disk array. The storage portion 23 may be constructed so as to hold all data in one storage unit, or so as to store data in a plurality of storage units in a dispersed manner. Although various kinds of data are stored in the storage portion 23, game-play data 51 and community data 52 are shown in FIG. 5. The game-play data 51 is data where the content of game-play is stored for a user to be possible to resume a game continuously from the last time situation. The game-play data 51 is generated for each user and stored in the storage portion 23 in association with identification information of each user. FIG. 5 shows only the game-play data 51 correlated with the identification information of one user. The community data 52 is data where stored are various kinds of data to be referred to when the user uses the community service. The community data 52 is generated also for each user and stored in the storage portion 23 in association with identification information of each user. FIG. 5 shows only the community data 52 correlated with the identification information of one user.

The game service management portion 21 provides predetermined game service to the game machine 3. As the game service, for example, there are the following services: the service of verifying a user by receiving verification information (as one example, identification information which is unique for each user and a password) of the user from the game machine 3, receiving and storing in the storage portion 23, the game-play data 51 corresponding to the user, or providing to the game machine 3 the game-play data 51 of the user stored in the storage portion 23; the service of matchmaking users of the game machines 3 according to some conditions to make them participate in the game; and the service of updating software of the game machine 3 (a program or data for the game) via the network 5. As a logical device for executing processing relating to the comment function, the game service management portion 21 is further provided with a comment processing portion 24. The comment processing portion 24 treats processing relating to transmission of comments to the game machine 3 and reception of comments from the game machine 3.

The Web service management portion 22 provides various kinds of Web service to the user terminal apparatus 4. As one example, the Web service management portion 22 verifies a user by receiving identification information (as one example, identification information unique for each user and a password) of the user from the user terminal apparatus 4, and in response to a request from the user verified, provides the game-play data 51 of the user to the user terminal apparatus 4 as data for browse. The Web service management portion 22 is further provided with a community service processing portion 25 as a logical device for realizing the community service mentioned above.

Further, on the center service 2, a charge service function is also implemented. The charge service function requires charge as a counter value of providing pay service on the game to a user of each of the game machine 3 and the user terminal apparatus 4, and collects the charge from the user. As a concrete payment method, any method may be applied as long as the counter value of the service is required to the user and the charge corresponding to the counter value is collected using electronic payment which makes it possible to pay the charge using communication of electronic data, such as a credit card, a debit card, or electronic money. The electronic payment may be publicly known one. The descriptions of concrete construction and procedure for realizing the electronic payment will be omitted.

Next, the game machine 3 is provided with a game controlling portion 31 and a storage portion 32. The game controlling portion 31 is a logical device realized by a combination of hardware of the game machine 3 (a CPU and memories as internal storage devices of the CPU) and software. The game controlling portion 31 executes various kinds of processing necessary to receive the game service provided by the game service management portion 21 of the center server 2, while executing various kinds of calculation control necessary to progress the game. The game controlling portion 31 is further provided with a game calculating portion 33, a game screen drawing portion 34, a comment processing portion 35 and a comment display controlling portion 36. The game calculating portion 33 executes various kinds of calculations necessary to progress the game in reference to operation information and the like of the user of the game machine 3. The game screen drawing portion 34 executes processing for drawing the game screen 110 according to the calculation result of the game calculating portion 33. The comment processing portion 35 executes processing for receiving a comment transmitted via the center server 2, and executes reply processing based on a reply operation by the user. The comment display controlling portion 36 executes processing of: receiving the calculation result from the game calculating portion 33; making a distinction between the display possible area 120 and the display restricted areas 121 in the game screen 110; receiving the comment from the comment processing portion 35; and displaying the comment in the display possible area.

Figure 6:
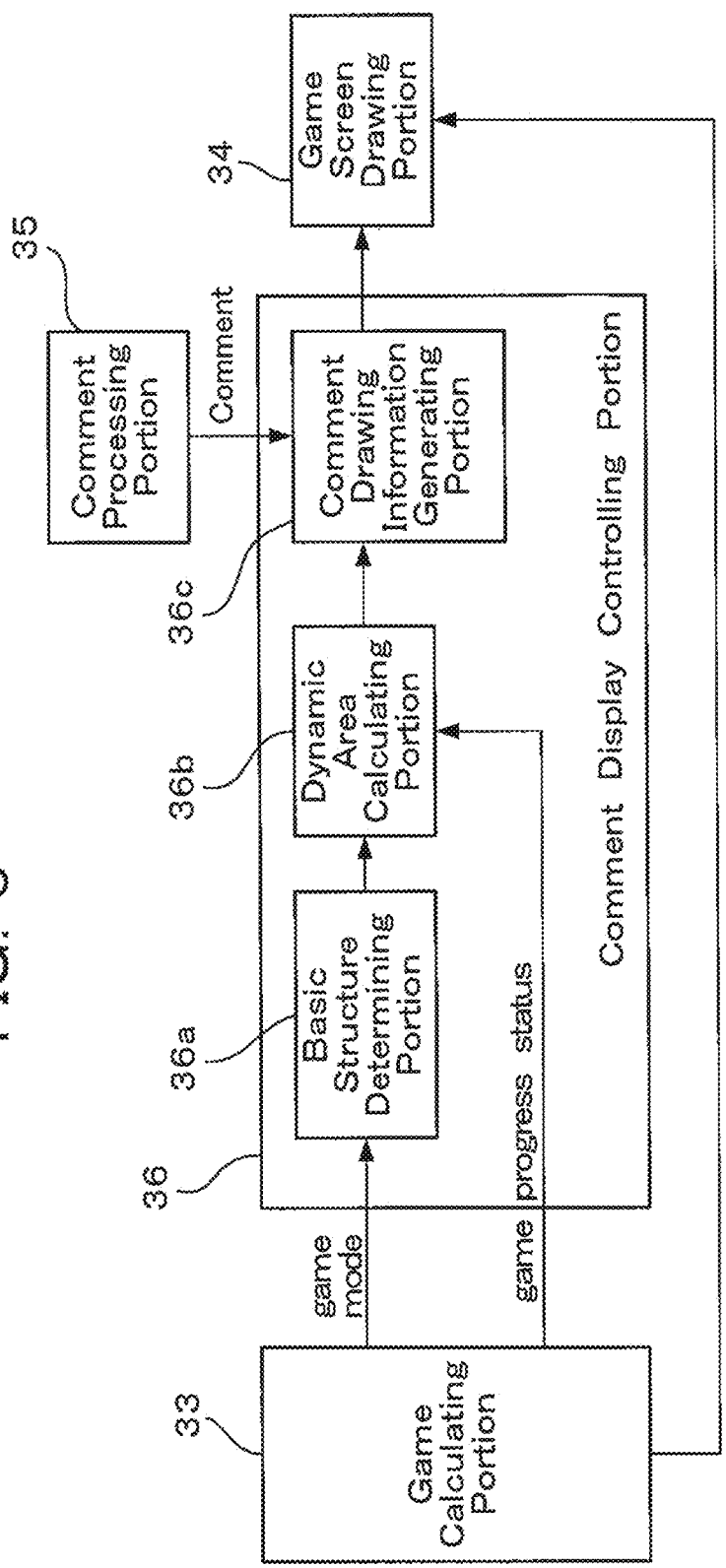
FIG. 6 is a detailed functional block diagram of a comment display controlling portion.

FIG. 6 is a functional block diagram showing further detail configuration of the comment display controlling portion 36. The comment display controlling portion 36 is further provided with a basic structure determining portion 36a, a dynamic area calculating portion 36b, and a comment drawing information generating portion 36c, as logical devices. The basic construction determining portion 36a obtains information for specifying the game mode from the game calculating portion 33, and determines a basic construction of the game screen 11 for the game mode. For example, in a case that the game screen 110 of the mahjongg game shown in FIGS. 3 and 4 is the processing object, the basic structure determining portion 36a obtains information for determining which the game mode is, the four-player-play or the three-player-play from the game calculating portion 33, and sections the game screen 110 into three areas. The three areas are: the area which should be always set as the display possible area 120; the area which should be always set as the display restricted area 121 (a fixed restricted area); and the area which changes to either the display possible area 120 or the display restricted area 121 depending on the shape and size of the dynamic area.

The dynamic area calculating portion 36b calculates the shape and size of each dynamic area based on the determination result of the basic structure determining portion 36a and the information for determining progress status of the game provided from the game calculating portion 33. For example, the dynamic area calculating portion 36b determines, based on the determination result of the basic structure determining portion 36a, which are dynamic areas as calculation objects are, the areas 121a to 121f of FIG. 3 or the areas 121a to 121d of FIG. 4, and calculates, based on the determination result and the progress status of the competition, the shape and size of each of the dynamic areas. The shape and size of all dynamic areas are calculated, and the area where each dynamic area calculated and each fixed restricted area are combined is determined as the display restricted area 121. Thereby, determined is the arrangement of the display possible area 120 and the display restricted areas 121 on the game screen 110. The comment drawing information generating portion 36c sets the position for displaying the comment window 111 in the display possible area 120 based on the calculation result of the dynamic area calculating portion 36b, takes, if necessary, information relating to the received comment (for example, the number of received comments, the content of each comment, and the like) from the comment processing portion 35 to determine a display content of the comment window 111, and according to the display content determined generates information necessary to draw the comment window 111, for example, information for specifying the position of the comment window 111, a text to be displayed in the comment window 111 and the like (hereinafter, sometimes referred to as the comment drawing information.)

The comment drawing information generated by the comment drawing information generating portion 36c is provided to the game screen drawing portion 34. When the comment drawing information is provided, the game screen drawing portion 34 draws the game screen 110 so that the image of the comment window 111 according to the comment drawing information is overlapped on image of the game according to the calculation result of the game calculating portion 33, and outputs to a display device 38 image display signals according to the drawing content so as to make the display device 38 display the game screen 110 including the comment window 111.

The description is back to FIG. 5. The storage portion 32 is an external storage device realized by a storage unit such as hard disk and a semiconductor storage device. Although various kinds of data are stored in the storage portion 32, the game-play data 51 provided from the center server 2 is shown in FIG. 5. Further, the user terminal apparatus 4 is provided with a Web service processing portion 41 as a logical device to be realized by combination of computer hardware (including a CPU and memories as internal storage devices) of the user terminal apparatus 4 and software. The Web service processing portion 41 executes processing necessary to receive various kinds of service to be provided by the service management portion 22 of the center server 2. The Web service processing portion 41 is further provided with a community service processing portion 42 as a further logical device. The community service processing portion 42 executes, in cooperation with the community service processing portion 25 of the center server 2, processing necessary to make the user of the user terminal apparatus 4 use the community function. Additionally, the user terminal apparatus 4 is also provided with an external storage device for storing data appropriately. However, the illustration of the external storage device is omitted.

Further, the game machine 3 is provided with various input output devices such as an input device (including a touch panel) 37 which outputs signals corresponding to operations of the user and a card reader 39, in addition to the display device 38 mentioned above. The card reader 39 is a device for reading a card ID unique for each card, the card ID being recorded on a card 8 owned by the user as one kind of identification information to be used for the user verification. It does not matter which the identification information of the user to be used for the user verification is identical or different between the user verification on the game machine 3 and the user verification on the user terminal apparatus 4. For example, while the card ID recorded on the card 8 of the user is used as the identification information on the game machine 3 and the game-play data 51 and the card ID is stored in the storage portion 23 in association with each other, a user ID set uniquely for each user may be used as the identification information of the user on the user terminal apparatus 4. In this case, it is possible to use any kind of ID as the identification information of the user by setting an association between the user ID and the card ID. Further, with respect to the community service, a community ID may be set as another ID different from the user ID to be used for the user verification on the user terminal apparatus 4. Also in this case, if the association is set between the IDs, it is possible to specify uniquely the game-play data 51 and the community data 52 corresponding to one user. Hereinafter, the card ID is used as the identification information necessary for the user verification on the game machine 3, the user ID is used as the identification information necessary for the user verification on the user terminal apparatus 4, and the community ID is used as the identification information necessary to use the community service. Further, those IDs are associated with each other by ID management data which is not shown.

Figure 7:
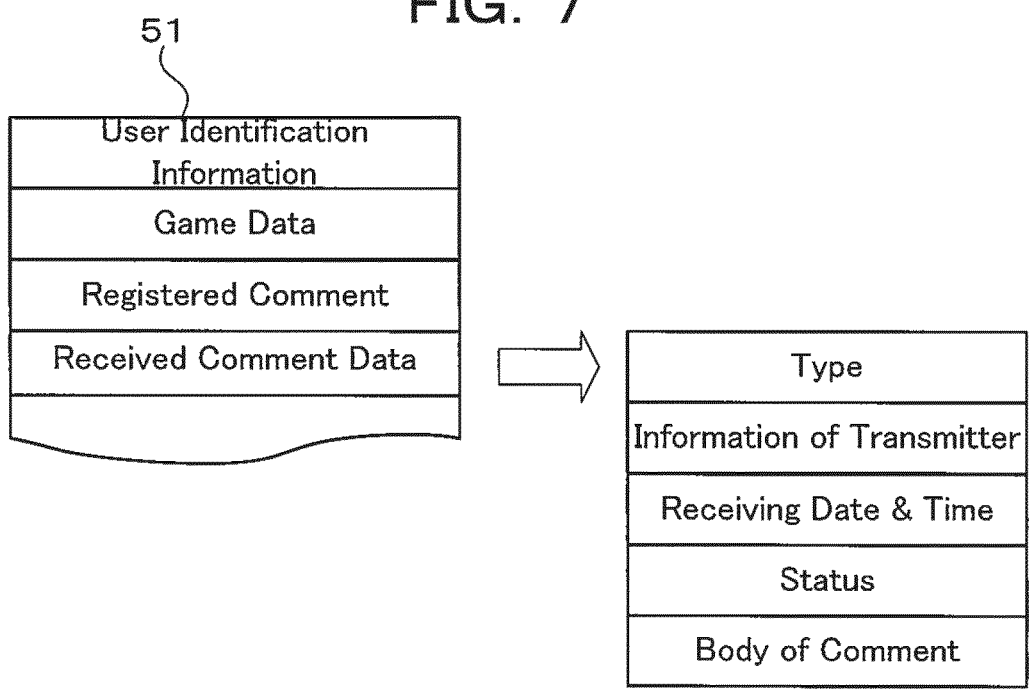
FIG. 7 is a diagram showing one example of the data structure of game-play data.

FIG. 7 shows an example of the game-play data 51. The game-play data 51 is data which is generated for each user, and has a structure that some pieces of information of the user as a processing object, such as game data, a registered comment, received comment data, are recorded in association with the identification information of the user (as one example, the card ID, but the other kind of ID set so as to be associable with the card ID can be used). The game data is data where recorded are saved data of the game played by the user on the game machine 3, and various kinds of results relating to the game-play, such as the number of times of game-play, scores, evaluation, and obtained points. The registered comment is data where a letter string to be transmitted by the user from the game machine 3 as his/her comment to the other user. The number of letter strings which is allowed to be stored as the registered comment is at least one. Plural comments may be registered in the registered comment. The data size per comment may be limited.

The received comment data is data where recorded are comments the user received from the other users. The number of comments which can be stored in the received comment data is limited to a fixed range from the latest one. For example, when the received comment data is set so as to store 10 comments and there are 11 or more received comments, 11th newest and older comments are deleted from the received comment data. The received comment data includes, for each comment, a type of comment; user information (the identification information and nickname) of a transmitter of the comment; receiving date and time when the comment was received; its status; and a body of comment. The type of comment includes information for distinguishing the content of the comment. For example, the information for distinguishing which type the comment should belongs to, "encouragement", "celebration", or "reply" is added in the type of comment. The status is information indicating whether the received comment has been read or not, and whether the reply has been done or not. The body of comment is text data of the body of comment.

Figure 8:
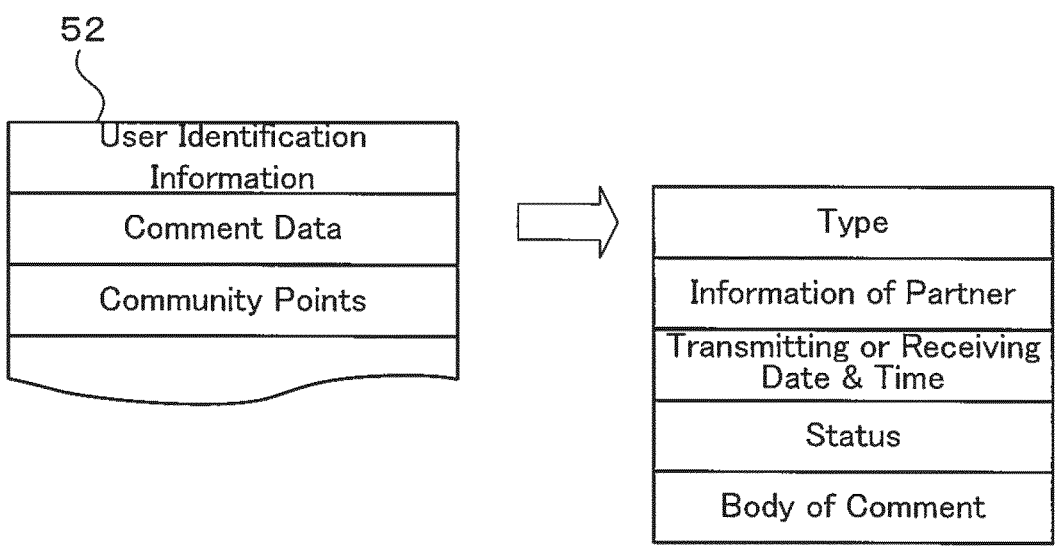
FIG. 8 is a diagram showing one example of the data structure of community data.

FIG. 8 shows an example of the community data 52. The community data 52 has a structure where some pieces of information of the user as the processing object, such as comment data, community points, and comment data, are recorded in association with the identification information (as one example, the community ID) of the user. The comment data is data where comments transmitted by the user to the other users and comments received from the other users are recorded. The internal structure of the comment data is different from the structure of the received comment data in the game-play data 51. Namely, the comment data in the community data 52 includes, for each comment, a type of comment; user information (the identification information and nickname) of a comment partner, that is, a transmitter or a destination of transmission, date and time when the comment was transmitted or received, its status, and a body of comment. The type of comment includes information for distinguishing the comment between the one received by the user (a received comment) and the one transmitted by the user (a transmitted comment), and further includes the information for distinguishing the content of the comment mentioned above. The status is information for determining whether the received comment has been already read by the user or not, and the reply has been done or not. The body of comment is text data of the body of comment.

Although the number of comments which can be stored in the comment data is limited appropriately for the situation, the upper limit of the number is set so as to be much bigger than the upper limit of the received comment data in the game-play data 51. On the game machine 3, as it is enough that comments are displayed within only a limited time during game-play, there is not problem if the number of comments which can be stored in the received comment data and the like are limited to a small value. On the other hand, on the user terminal apparatus 4 for personal use, as the user can browse comments as needed, it is required to store received and transmitted comments back to the past by a considerable term to provide the comments for user's browse. Then, the upper limit of the number of comments which can be stored in the comment data of the community data 52 is set to a considerable big value as with the number of comments in a general community service. The limit of the number of comments which can be stored may be realized by the number of comments itself, or by limiting data size which is available for storing comments.

The community points are points which are given as a privilege to the user according to the frequency of using the community service. The user can apply the points toward a part of the charge when using a pay service to be provided by the center server 2, or can consume the points in order to receive a certain privilege in the game which is provided on the game machine 3. In the game system 1, the user transmits his/her comment using the community function, and when the user receives a comment, the community points are given to the user. However, a certain restriction, such as once per day, may be applied to the point giving.

The user activates a program necessary to receive the community service on the user terminal apparatus 4, and inputs to the user terminal apparatus 4, his/her user ID and the community ID associated with the user ID for the login. Thereby, the user can download the community data 52 corresponding to his/her community ID to the user terminal apparatus 4. However, with respect to the comment data, the system may be set as follows: the comments included in a predetermined range from the latest one are downloaded, and when the user requests to download further older comments, the comments included in the next range are downloaded.

Figure 9:
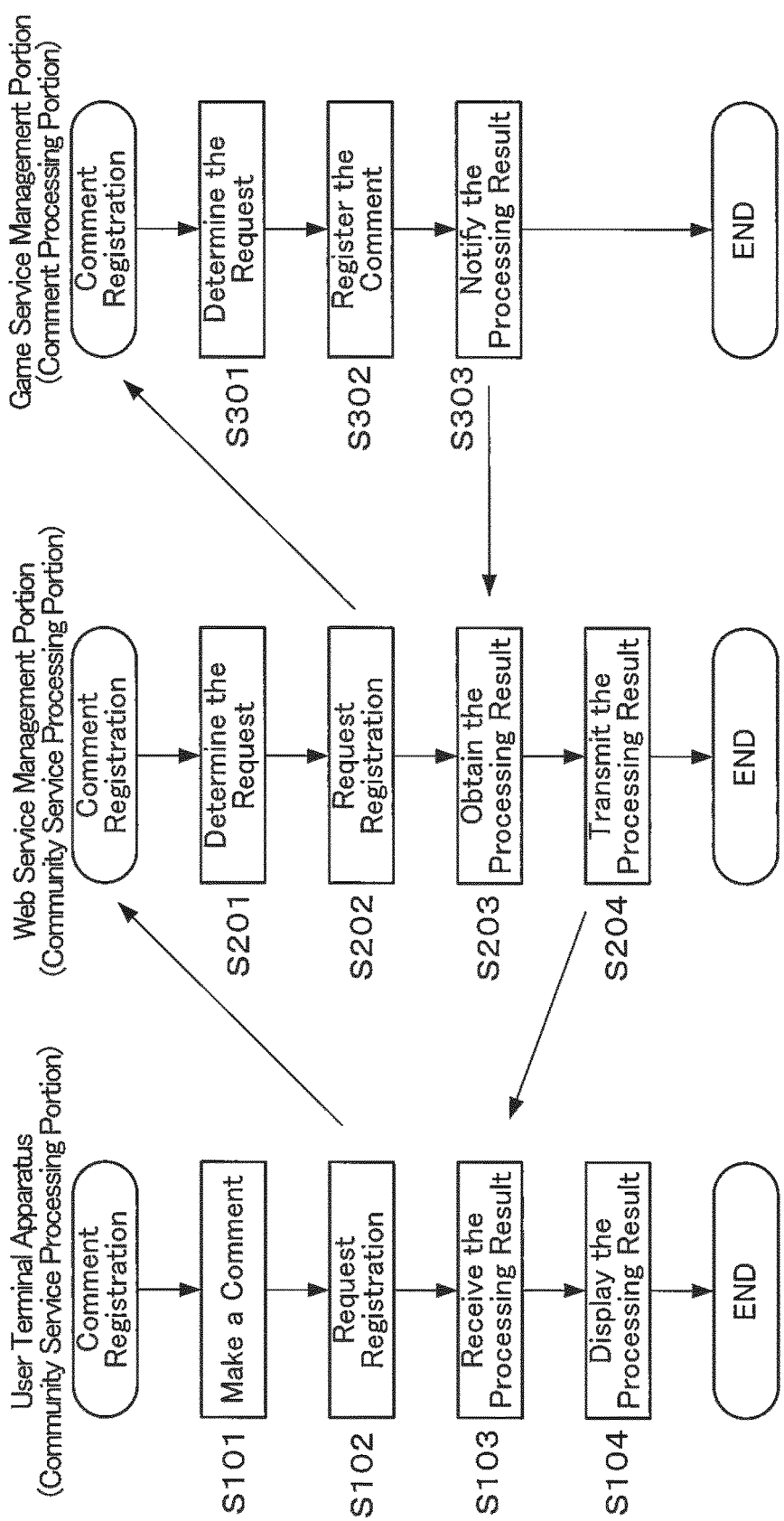
FIG. 9 is a flow chart showing procedures of processing to be executed for recording a comment for reply in the game-play data.

Next, with respect to various kinds of processing which are executed in the game system 1, mainly a part relating to comment exchange between the game machine 3 and the user terminal apparatus 4 will be described. FIG. 9 shows processing for registering a comment for reply (the registered comment) from the game machine 3 in the game-play data 51. The registration of the comment is started, when the user orders the start of comment registration processing on the user terminal apparatus 4. In response to the order, the community service processing portion 42 of the user terminal apparatus 4 displays a predetermined comment making screen and accepts comment making (input) by the user (step S101). The comment making by the user may be realized by making the user input a voluntary letter string using a function of inputting letter strings on the user terminal apparatus 4, or by making the user select from fixed phrases recorded in the user terminal apparatus 4 in advance.

Subsequently, the user terminal apparatus 4 transmits the comment made by the user to the center server 2 and requests the registration of the comments (step S102). At this moment, the user verification is needed on the center server 2. The ID to be used for the user verification may be the user ID or the community ID, whichever. The user verification may be executed prior to the comment making in step S101. The Web service management portion 22 of the center server 2, when receiving a comment registration request from the user terminal apparatus 4, makes the community service processing portion 25 start the comment registration processing of FIG. 9. The community service processing portion 25 determines the content of the request transmitted from the user terminal apparatus 4, here, the ID for specifying the user and the content of the comment (step S201). Subsequently, the community service processing portion 25 provides the registration request from the user terminal apparatus 4 to the comment processing portion 24 of the game service management portion 21 (step S202). When receiving the registration request, the comment processing portion 24 starts the registration processing in FIG. 9, and first determines the content of the request, here the ID of the user and the content of the comment (step S301). Subsequently, the comment processing portion 24 extracts the game-play data 51 associated with the ID of the user, and registers the comment received from the community service processing portion 25 in the registered comment of the game-play data 51 (step S302). After the registration, the comment processing portion 24 notifies the community service processing portion 25 of a processing result (step S303). The community service processing portion 25 obtains the processing result (step S203), and transmits the processing result to the user terminal apparatus 4 (step S204). The user terminal apparatus 4 receives the processing result (step S103), and displays the processing result for the user (step S104). With that, the comment registration processing completes.

Next, in reference to FIGS. 10 and 11, processing for transmitting and receiving comments on the user terminal apparatus 4 will be described. FIG. 10 shows processing which is executed by the community service processing portions 25 and 42 in relation to reception of comments on the user terminal apparatus 4. The processing shown in FIG. 10 is processing for updating the comment data in a state that the user has already logged in the community service on the user terminal apparatus 4 and the community data 52 has been read into the user terminal apparatus 4. When starting a comment reception processing, the community service processing portion 42 of the user terminal apparatus 4, first, requests transmission of the comment data to the community service processing portion 25 of the center server 2 (step S111). In this case, the community ID of the user is also transmitted from the user terminal apparatus 4 to the community service processing portion 25. The comment reception processing on the user terminal apparatus 4 may be started by a reception operation by the user as a trigger, or may be started automatically at a constant frequency by the community service processing portion 42. The former one is a typical pull-based delivery where the reception is started based on the operation by the user. Although the later one is also a type of the pull-based delivery, when the cycle of reception processing is made short, it is possible to realize a pseudo push-based comment delivery.

When receiving a comment data request from the user terminal apparatus 4, the community service processing portion 25 of the center server 2 starts a comment transmission processing. In the comment transmission processing, first, the community service processing portion 25 determines the community ID transmitted from the user terminal apparatus 4 (step S211). Subsequently, the community service processing portion 25 extracts the community data 52 corresponding to the community ID determined, and transmits to the user terminal apparatus 4 the comment data included in the community data 52 extracted (step S212). In this case, the procedure may be set so that the comment data in a divided state is transmitted and received in such a way that the comments of the comment data included in a predetermined range from the latest one are transmitted, and when the user requests to transmit further older comments of the comment data, the comments of the comment data included in the next range are transmitted. The number of comments or the size of the comment data to be transmitted at one time may be changed appropriately for the type of user terminal apparatus 4. For example, the system may be set as follows. A function of determining the type of user terminal apparatus 4 is added to the community service processing portion 25. In a case of a PC having comparatively high processing ability, the range of transmission for one time is made comparatively big, and in a case of a portable terminal (a portable phone or a smart phone), the range of transmission for one time is made comparatively small.

After transmitting the comment data, the community service processing portion 25 updates the status of the comment data so that the status of the comment transmitted to the user terminal apparatus 4 indicates "already read", and adds a predetermined number of points to the community points of the user who received the comments (step S213). Also in this case, a certain restriction, such as once per day, may be applied to the point addition. On the other hand, the community service processing portion 42 of the user terminal apparatus 4 receives the comment data transmitted from the center server 2 (step S112), replaces the comment data held by the user terminal apparatus itself with the newly received comment data, and displays the comment browse screen 100 (see FIG. 2) based on the newly received comment data (step S113). Thereby, the browse screen 100 based on the latest comment data is displayed on the user terminal apparatus 4. Accordingly, it is possible for the user to browse unread comments held by the center server 2. With that, the processing necessary to receive comments on the user terminal apparatus 4 completes.

FIG. 11 shows processing which is executed by the community service processing portions 25 and 42 in relation to transmission of a comment from the user terminal apparatus 4. The processing shown in FIG. 11 is also processing to be performed in a state that the user has already logged in the community service on the user terminal apparatus 4 and the community data 52 has been read into the user terminal apparatus 4. That is, the transmission and reception of comments on the user terminal apparatus 4 are executed in a state that the user has logged in the community service of the center server 2 with using the community ID.

When comment transmission processing is started by the community service processing portion 42 of the user terminal apparatus 4, the community service processing portion 42 makes the user select a transmission partner (step S111). The comment transmission processing by the community service processing portion 42 may be started when the user has selected the comment as a reply object on the browse screen 100 as a trigger, or when the user has performed a comment making operation on the user terminal apparatus 4 as a trigger. In a case of the former one, the transmission partner is a user who is the transmitter of the comment as the reply object. In a case of the latter one, the user can select the transmission partner appropriately to the situation. Subsequently, the community service processing portion 42 obtains the content of the comment (a letter string) to be transmitted from the user (step S122). In this case, as with the case of moment when the comment for reply is registered, the comment may be made by making the user input a voluntary letter string using the function of inputting letter strings on the user terminal apparatus 4, or by making the user select from fixed phrases recorded in the user terminal apparatus 4 in advance.

After obtaining the comment, the community service processing portion 42 of the user terminal apparatus 4 transmits the comment to the center server 2 (step S123). The information to be transmitted includes, besides the body of comment, the community ID of the transmission partner, the community ID of the transmitter, the information for distinguishing the content of the comment, and the like. The information for distinguishing the content of the comment is information for distinguishing which the comment belongs to, "encouragement", "celebration", or "reply". The specification may be entrusted to the user, or determined automatically by the user terminal apparatus 4. For example, the system may be set as follows. In a case the user selects a transmission partner (a destination of transmission) by selecting a received comment in the browse screen 100, "reply" is selected automatically, and in other cases, either "celebration" or "encouragement" is selected automatically depending on the content of the comment. When receiving the comment transmitted from the user terminal apparatus 4, the community service processing portion 25 of the center server 2 starts a comment reception processing, and, first, determines the community ID of each of the destination of transmission and the transmitter of the comment transmitted (step S221). Subsequently, the community service processing portion 25 records the comment obtained (including the type and the like shown in FIGS. 7 and 8) as the received comment in the comment data of the community data 52 of the transmission partner, and also records as the transmitted comment in the comment data of the community data 52 of the transmitter (step S222). Next, the community service processing portion 25 adds a predetermined number of points to the community points of the community data 52 of the transmitter (step S223). Also in this case, a certain restriction, such as once per day, may be applied to the point addition. In step S223, when the comment the user transmitted is a reply to the comment from the other user, the community service processing portion 25 updates the status of the comment which is the reply object so that the status thereof indicates "already replied". With that, the processing necessary to transmit and receive comments completes.

Next, processing relating to receiving or transmitting comments on the game machine 3 will be described. The processing which will be described hereinafter is processing which is executed in a state that by making the card reader 39 of the game machine 3 read the card ID from the card 38 of the user, the user has been verified by the center server 2, and after that, the game-play data 51 corresponding to the user has been provided to the game machine 3 and stored in the storage device 32 of the game machine 3.

Figure 12:
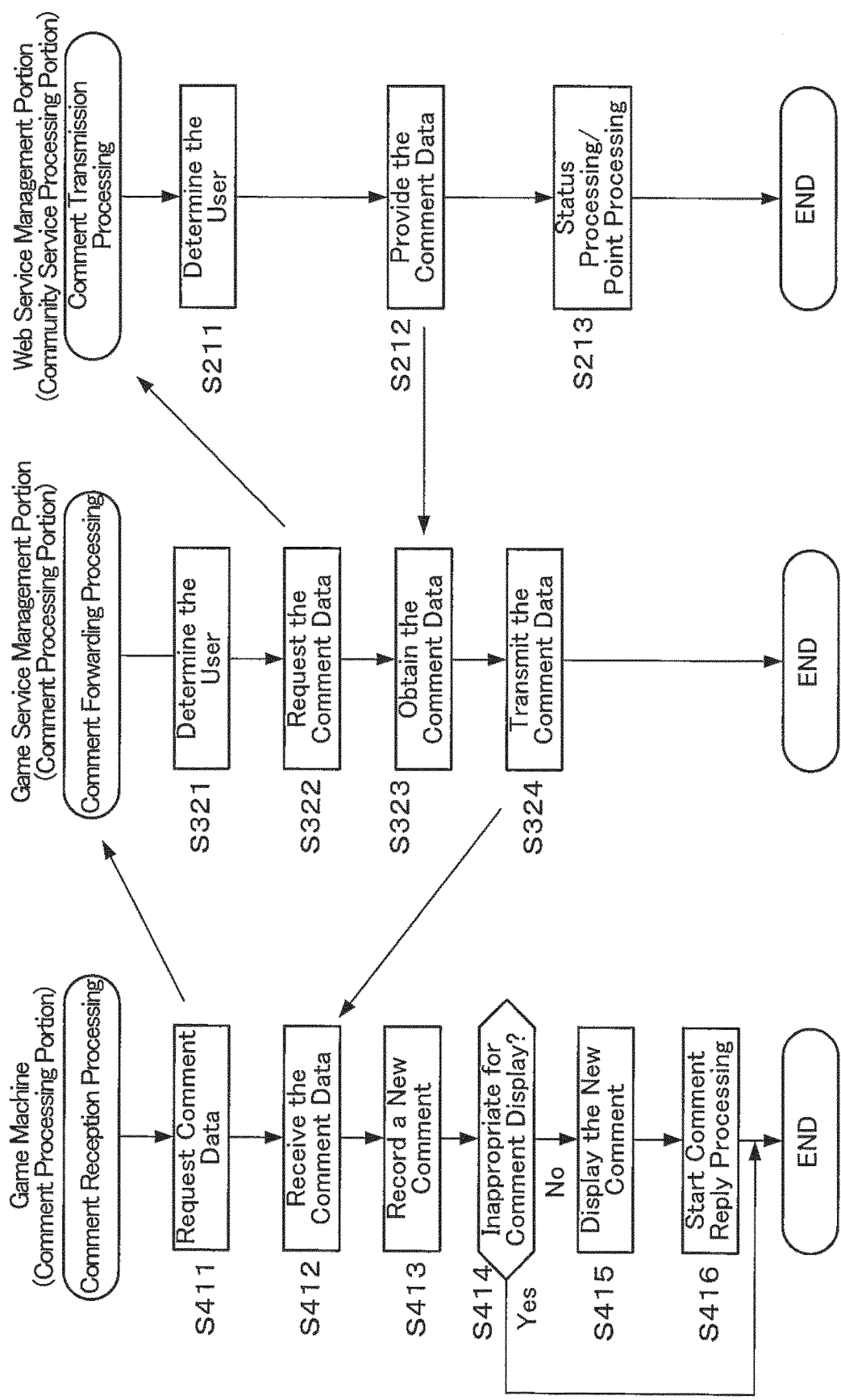
FIG. 12 is a flow chart showing procedures of processing to be executed for making the user receive a comment on the game machine.

FIG. 12 shows processing which is executed by the comment processing portions 24 and 35 and the community service processing portion 25 in relation to the reception of comments on the game machine 3. When starting a comment reception processing shown in FIG. 12, the comment processing portion 35 of the game machine 3 requests the center server 2 to transmit the comment data (step S411). In this case, the identification information of the user is transmitted to the center server 2. The identification information may be the card ID which has been read by the card reader 39 of the game machine 3, or in a case that the game machine 3 has obtained the user ID and the community ID for the user verification, those IDs may be transmitted to the center server 2. In addition, the comment reception processing on the game machine 3 may be started when a reception operation is performed by the user as a trigger, or may be started automatically at a constant frequency. As game-play time of the game is limited on the game machine 3, in a case that the reception processing is executed automatically, it would be better to realize a pseudo push-based comment delivery by making the frequency of reception processing short.

When it is requested by the game machine 3 to transmit the comment data, the comment processing portion 24 of the center server 2 starts a comment forwarding processing shown in FIG. 12. In the comment forwarding processing, the comment processing portion 24 determines the user of the game machine 3 based on the identification information of him/her (step S321). Subsequently, the comment processing portion 24 requests the community service processing portion 25 to provide the comment data corresponding to the user (step S322). In response to the request from the comment processing portion 24, the community service processing portion 25 starts a comment transmission processing shown in FIG. 12. The comment transmission processing is the same as the comment transmission processing executed by the community service processing portion 25 shown in FIG. 10. That is, as it is requested from the comment processing portion 24 to provide the comment data specifying the user, the community service processing portion 25 determines the community ID corresponding to the user (step S211), provides the comment data included in the community data 52 corresponding to the user to the requestor, in this case, the comment processing portion 24 (step S212), and executes update processing of the status of the community data 52 and addition processing of the community points (step S213).

The comment processing portion 24 obtains the comment data from the community service processing portion 25 (step S323), and transmits the comment data to the game machine 3 (step S324). The comment processing portion 35 of the game machine 3 receives the comment data from the center server 2 (step S412). Next, the comment processing portion 35 selects a new comment by comparing the received comments included in the comment data received, with the received comments in the game-play data 51 of the game machine 3 itself, and records data of the new comment as the received comment data in the game-play data 51 (step S413). The new comment is the received comment the receiving date of which is newer than the receiving date of the latest received comment held in the game-play data 51, and also the status of which is set to "unread". The reason why the status of the new comment is limited to "unread" is that there is a possibility that a received comment which was browsed on the user terminal apparatus 4 exists, even if the received comment does not exist in the game-play data 51. In a case that the number of comments of the received comment data in the game-play data 51 exceeds its limit by recording the new comment, necessary pieces of comments are deleted from the received comments which have been already recorded in the received comment data. If the number of new comments itself exceeds the limit, the latest comment is prioritized, and older comments which exceed the limit are not recorded in the game-play data 51 even if they are the new comments. When the new comment is recorded, also recorded are various kinds of information such as the type and the transmitter information, which are included in the data of the new comment.

Next, the comment processing portion 35 of the game machine 3 determines whether the game is in a state inappropriate for comment display (step S414). For example, the following cases can be determined as the state inappropriate for comment display: the case that predetermined effects are performed and it is necessary to draw the intention of the user to the effects; the case that it is considered that the intention of the user should be concentrated in the game-play itself because the game goes into a predetermined scene, such as an interesting scene; or the like. As the predetermined scenes, there could be a scene where the user himself/herself or a competitor has declared "Riichi", and the like, in a mah-jongg game, and there could be a scene where the bases are full, and the like, in a baseball game. Also, even in the other games, in a case that the game reaches an interesting scene or a keyed scene, and it is considered that the intention of the user should be concentrated in the game-play, it is determined that such a state is inappropriate for comment display.

When a negative determination is obtained in step S414, that is, when it is determined that the state is inappropriate for comment display, the comment processing portion 35 requests the comment display controlling portion 36 to execute processing so that the new comment recorded in step S413 is displayed in the comment window 111 of the game screen 110 (step S415). The procedures of the processing by the comment display controlling portion 36 will be described later. The new comment is displayed via plural steps in such a way that, first, a message that a new comment exists is displayed in the window 111, and when the user performs a touch operation on the window 111 the body of comment is displayed. In a case there are plural new comments, first, the number of new comments is displayed in the window 111, and after that, via the touch operation by the user, the latest comment is displayed in the window 111 (see FIG. 2).

Next, the comment processing portion 35 starts comment reply processing (step S416), and after that, ends the processing of FIG. 12. The comment reply processing will be described later. On the other hand, when it is determined that the state is inappropriate for comment display, the comment processing portion 35 skips the processing of steps S415 and S416, and ends the processing of FIG. 12. In this case, even if the new comment has been received, the message that a new comment exists is not displayed on the game machine 3. In the above description, the new comment is selected and recorded on the game machine 3. However, as the game-play data 51 also exists on the center server 2, the following system may be applied. The new comment is selected and recorded by, for example, the comment processing portion 24 of the center server 2. After updating the received comment data, the received comment data updated is transmitted to the game machine 3.

Figure 13:
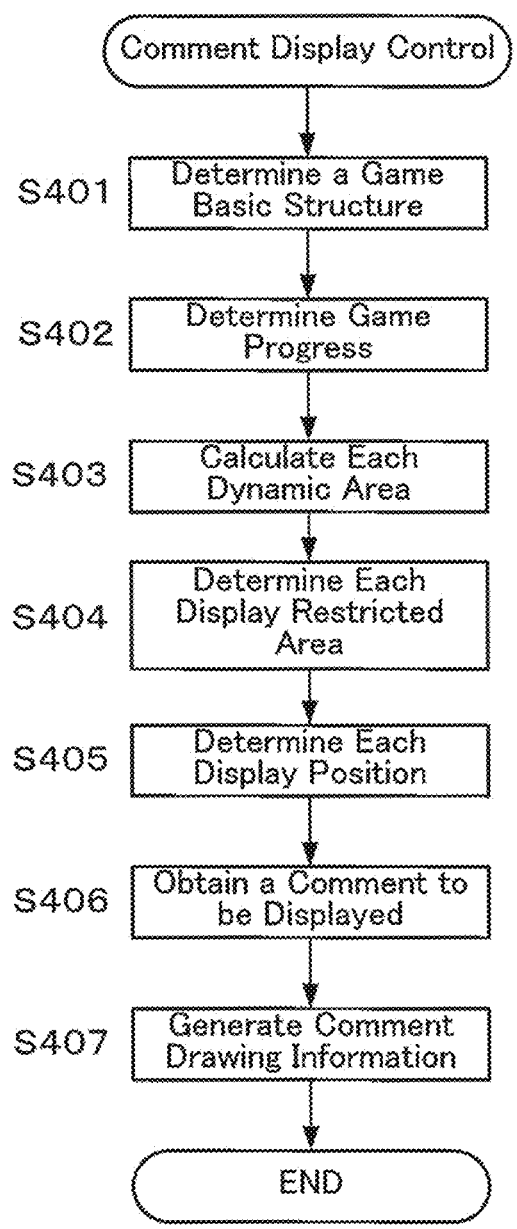
FIG. 13 is a flow chart showing procedures of comment display controlling processing for displaying a comment avoiding the display restricted area on the game screen.

FIG. 13 shows a procedure of comment display control executed by the comment display controlling portion 36. This processing is started because of step S415 of FIG. 12. When starting the comment display control processing shown in FIG. 13, the comment display controlling portion 36 makes the basic structure determining portion 36a determine the basic structure of the game screen 110 (step S401). During one ongoing competition, the game mode does not change. Accordingly, the basic structure determining portion 36a may determine the basic structure by obtaining information of the game mode from the game calculating portion 33 only when the processing of FIG. 13 is executed first, and at the second processing, the result already determined may be used as it is. Subsequently, the comment display controlling portion 36 takes in information for determining the progress status of the game from the game calculating portion 33 to the dynamic area calculating portion 36b (step S402), and makes the dynamic area calculating portion 36b calculate the shape and size of each dynamic area based on the information taken (step S403). After that, the comment display controlling portion 36 determines the position of the display restricted areas 121 on the game screen 110 based on the determination result of the basic structure determining portion 36a and the calculation result of the dynamic area calculating portion 36b (step S404).

After determining the display restricted areas 121, the comment display controlling portion 36 determines a position for displaying the comment window 111 so as to avoid the display restricted areas 121 determined in step S404 (step S405). Further, the comment display controlling portion 36 takes in a comment which should be displayed on the game screen 110 from the comment processing portion 35 to the comment drawing information generating portion 36c (step S406), and makes the comment drawing information generating portion 36c generate comment drawing on the game screen 110, information necessary to draw the comment window 111 including the comment (step S407). With that, the comment display controlling portion 36 ends the processing of FIG. 13 of the current time. The comment drawing information generated in step S407 is outputted to the game screen drawing portion 34, and the image of the comment window 111 according to the comment drawing information is overlapped on the image of the game according to the calculation result of the game calculating portion 33. Thereby, as shown in FIGS. 3 and 4, the game screen 110 where the comment window 111 is allocated in the display possible area 120 is displayed on the display device 38.

Figure 14:
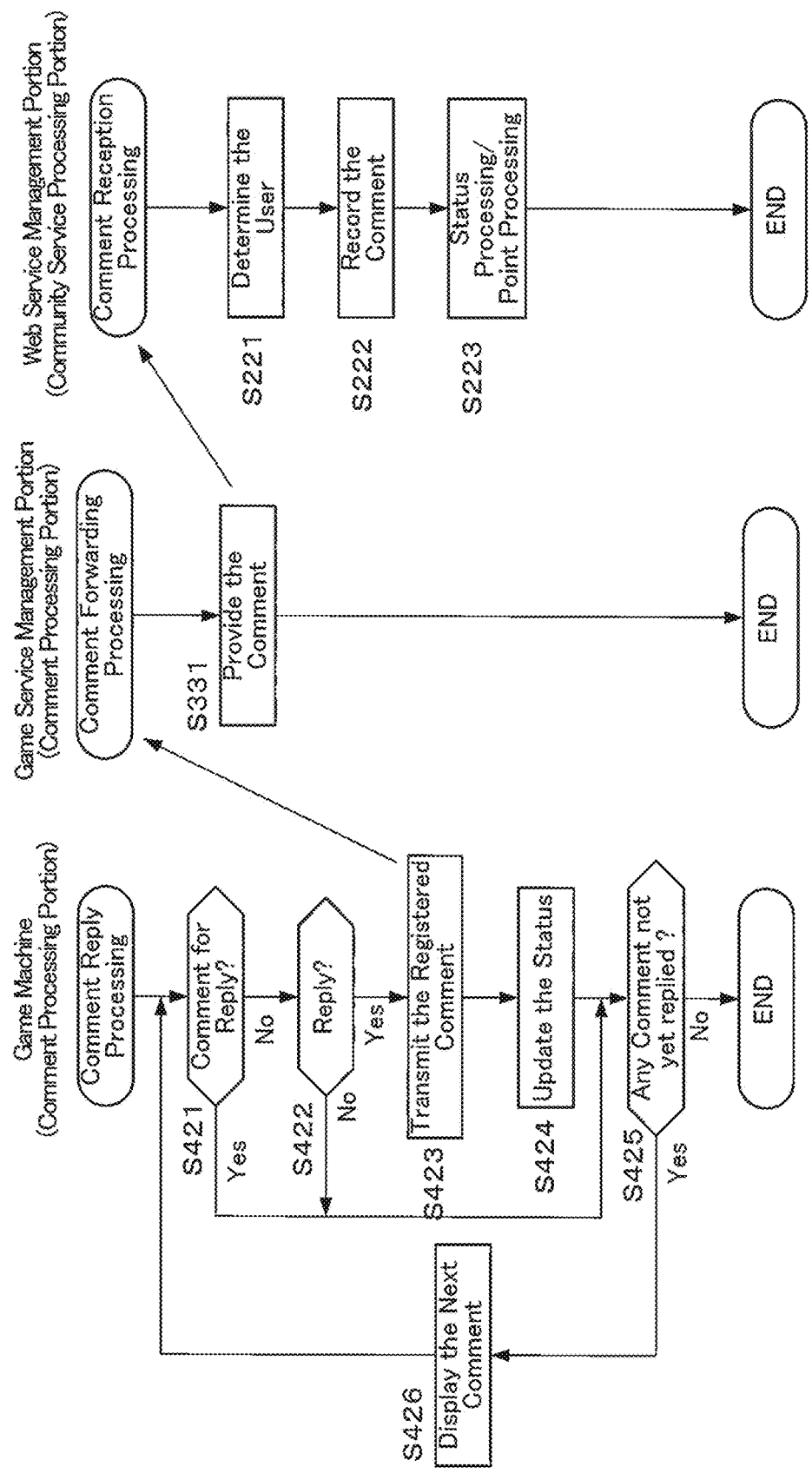
FIG. 14 is a flow chart showing procedures of processing to be executed for making the user transmit a comment from the game machine.

FIG. 14 shows processing executed by the comment processing portions 24 and 35 and the community service processing portion 25 in relation to comment transmission from the game machine 3. By using step S416 of FIG. 12 as a trigger, the comment processing portion 35 of the game machine 3 starts the comment reply processing shown in FIG. 14. In the comment reply processing, the comment processing portion 35 first determines whether the comment displayed in the window 111 (at the first time, the latest received comment) is a "reply" comment or not, based on the type of the received comment (step S421). When the comment is not the "reply" comment, the comment processing portion 35 determines whether the user has ordered a reply or not (step S422). As explained in FIG. 2, the reply of comment is ordered by the touch operation on the window 111. When the reply of comment has been ordered, the comment processing portion 35 transmits to the center server 2, transmitted comment data having the registered comment held in the game-play data 51, as the body of comment (step S423). At this moment, the identification information of the user who is a transmitter of the registered comment and the community ID of a user who is a destination of transmission of the registered comment are included in the transmitted comment data to be transmitted. It is possible to determine the community ID of the destination of transmission from the information of a transmitter (See FIG. 7) included in the received comment data which is the new comment being displayed in the window 111.

In a case that it is possible to register plural pieces of registered comments in the game-play data 51, processing is necessary to select one of registered comments as a transmission object. It is possible to realize the selection by, for example, displaying a list of registered comments to make the user select one registered comment. Without an order from the user, the comment processing portion 35 may select any one of registered comments from the plural pieces of registered comments according to a predetermined procedure. For example, the following system may be applied: at the moment when registered comments are registered, selection information is also set to each register comment; and the game machine 3 selects one appropriate comment in reference to the selection information. As the selection information, for example, the type of comment which is a reply object ("encouragement" or "celebration"), hours or date and time appropriate for selection, or the like can be set as appropriate. The registered comment may be selected by a combination of the order by the user and the selection control by the game machine 3.

After executing step S423, the comment processing portion 35 of the game machine 3 updates the game-play data 51 so that the status in the data of the comment to which the user ordered a reply, that is, in the received comment data corresponding to the comment being displayed in the window 111 indicates "already replied" (step S424). Subsequently, the comment processing portion 35 determines whether the display has competed or not with respect to all unreplied comments being held in the game-play data 51 (step S425). When an affirmative determination is obtained in step S421 or a negative determination is obtained in step S422, the comment processing portion 35 goes to step S425. In a case that any unreplied comment remains in step S425, the comment processing portion 35 displays the next unreplied comment in the window 111 (step S426), and returns to step S421.

When receiving the data of registered comment transmitted from the game machine 3, the comment processing portion 24 of the center server 2 starts the comment forwarding processing shown in FIG. 14, and provides the comment data received from the game machine 3 to the community service processing portion 25 (step S331). When receiving the data of registered comment, the community service processing portion 25 executes processing similar to the comment reception processing of FIG. 11. That is, the community service processing portion 25 determines the community ID corresponding to the user identification information of the transmitter, the user identification information being included in the comment data forwarded from the comment processing portion 24, and obtains the community ID of the destination of transmission included in the comment data forwarded (step S221). Subsequently, the community service processing portion 25 records the comment data obtained in the comment data of the community data 52 of the transmission partner as the data of the received comment, and also records in the comment data of the community data 52 of the transmitter as the data of the transmitted comment (step S222). Next, the community service processing portion 25 adds a predetermined number of points to the community points in the community data 52 of the transmitter (step S223). Also with respect to this point addition, a certain restriction, such as once per day, may be applied. In a case that the comment transmitted by the user is a reply to a comment from the other user, in step S223, the community service processing portion 25 updates to "already replied", the status of the comment as a reply object. With that, the processing necessary to transmit a comment from the game machine 3 completes.

In the processing shown in FIGS. 12 and 14, the game service management portion 21 is intervened between the game machine 3 and the Web service management portion 22 of the center server 2. However, the game service management portion 21 can be omitted, and the procedure may be changed so that the game machine 3 accesses the Web service management portion 22 directly to communicate comments between them.

In the first embodiment mentioned above, the comment display controlling portion 36 of the game machine 3 functions as the comment display controlling device of the present invention. The basic structure determining portion 36a and the dynamic area calculating portion 36b function as the area determining device of the present invention by executing steps S401 to S404 of FIG. 13. The comment drawing information generating portion 36c functions as the display restricting device of the present invention by executing steps S405 to S407 of FIG. 13.

Second Embodiment

Figure 15:
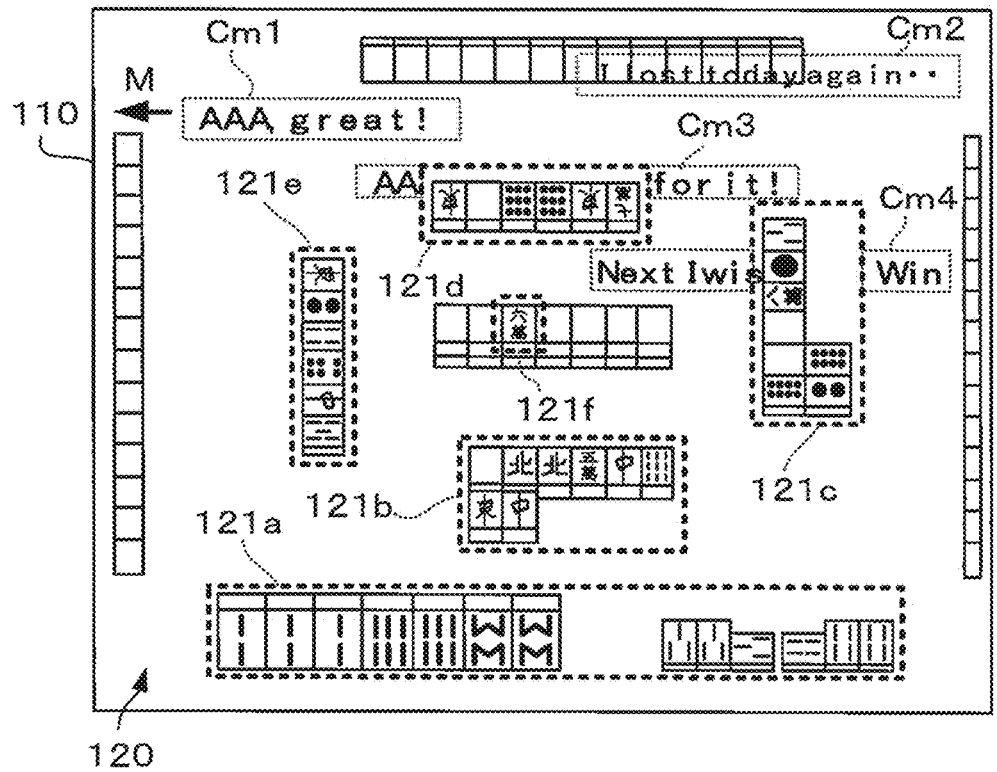
FIG. 15 is a diagram showing one example of the game screen in the second embodiment.
Figure 16:
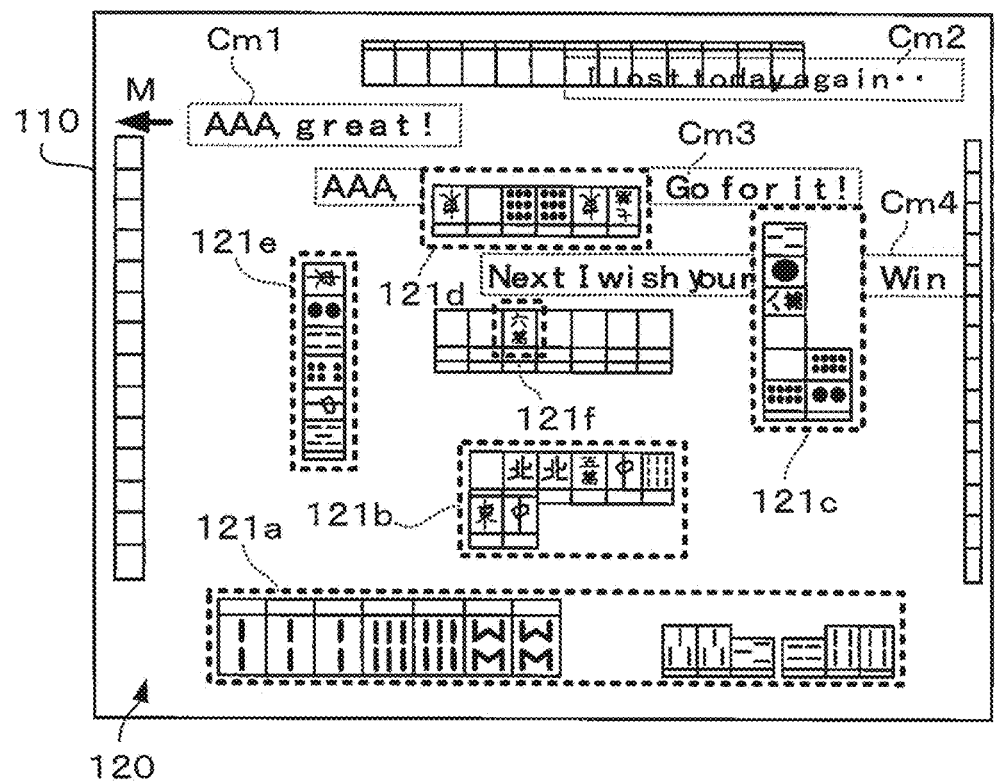
FIG. 16 is a diagram showing another example of the game screen in the second embodiment.

Next, a game system according to a second embodiment of the present invention will be described. The present embodiment is changed from the first embodiment in a display method of a received mail on the game machine 3, and the different points will be mainly described. FIGS. 15 and 16 show examples of comment display mode in the present embodiment. As shown in these figures, in the present embodiment, a plurality of comments Cm1, Cm2 . . . (hereinafter, each one is represented as the Cm) are displayed at the same time on the game screen 110. In FIGS. 15 and 16, though each comment Cm is surrounded by a dashed rectangular, the dashed part is not displayed in an actual game screen 110.

Each comment Cm moves at a predetermined speed in the display possible area 120 from the right end to the left end of the game screen 110. In a case that the display restricted area 121 exists on a moving route of each comment Cm, the display of the comment Cm is restricted so as not to display the comment Cm in the display restricted area 121. As modes where the comment Cm is not displayed, there are two modes, one mode where a part overlapping with the display restricted area 121 within the letter string of the comment Cm is erased as if the part hid behind the area 121, like the comments Cm3 and Cm4 exemplified in FIG. 15 (hereinafter, this mode will be referred to as "the first mode"), and another mode where when the letter string of the comment Cm reaches the right end of the display restricted area 121, the letter string is displayed on the left end of the display restricted area 121 as if the letter string moved in a moment, like the comments Cm3 and Cm4 exemplified in FIG. 16 (hereinafter, this mode will be referred to as the second mode). As one example, with respect to the comment Cm3, in the first mode shown in FIG. 15, the letter string "A! Go" out of the letter string "AAA! Go for it!" is hidden by the display restricted area 121d, and the letter strings other than the hidden letters are displayed on the right side and the left side of the area 121d. On the other hand, in the second embodiment shown in FIG. 16, the letter string "AAA!" and the letter string "Go for it!" are displayed separately on the left and the right sides of the display restricted area 121 respectively.

Next, in reference to FIGS. 17 and 18, according to the first mode and the second mode, a screen drawing method for switching between display and no-display of a comment will be described. For simplification, in FIGS. 17 and 18, comments and the like are shown in a simplified mode, in comparison with FIGS. 15 and 16.

First, in reference to FIG. 17, the method of drawing the comment Cm in the first mode will be described. In a case that the comment Cm is drawn according to the first mode, as layers for comment drawing according to the first mode, the first and the second layers Ly1 and Ly2 are provided. On the first layer Ly1, the display restricted area 121 of the game screen 110 is drawn as a mask portion 141 which is opaque. A portion other than the mask portion 141 on the first layer Ly1, that is, a part corresponding to the display possible area 120 of the game screen 110 is transparent. The second layer Ly2 is allocated on the lower side of the first layer Ly1. On the second layer Ly2, the comment Cm is drawn so as to move by degrees from the right end to the left end of the game screen 110. By overlapping the first layer Ly1 with the second layer Ly2 according to the vertical relationship of them and drawing them, it is possible to draw the image of the comment Cm according to the first mode as shown in FIG. 15. Further, by setting, with respect to the image drawn in a state that the layers Ly1 and Ly2 are overlapped with each other, a part other than a color part of letters of the comment Cm as a transparent part, and drawing and overlapping such image with an image where a competition state is drawn for the game screen 110, it is possible to draw the game screen 110 where the comment Cm is overlapped with the image of the competition state as shown in FIG. 15.

Figure 17:
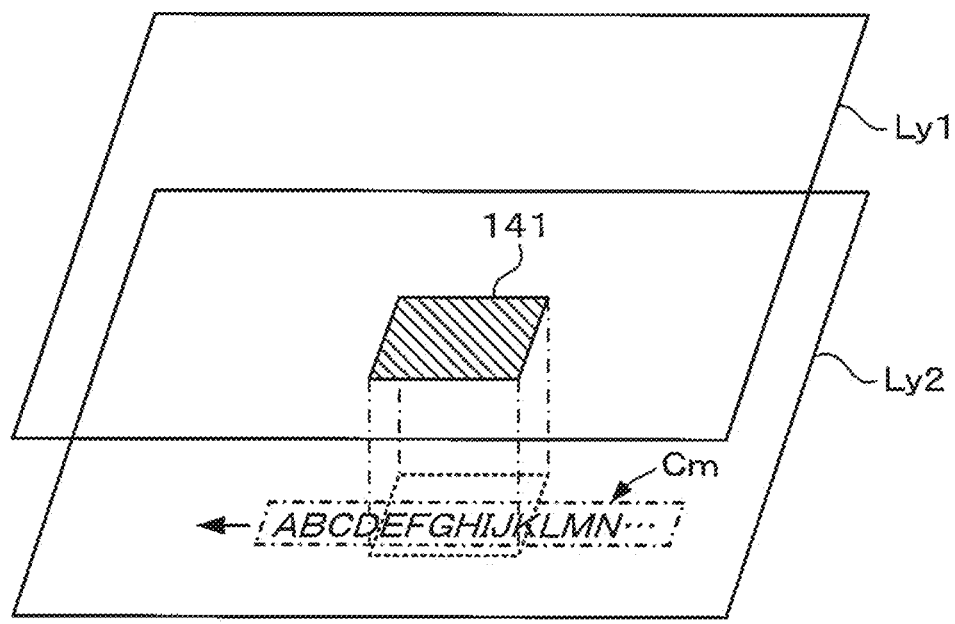
FIG. 17 is a diagram showing a method for drawing a comment according to FIG. 15.
Figure 18:
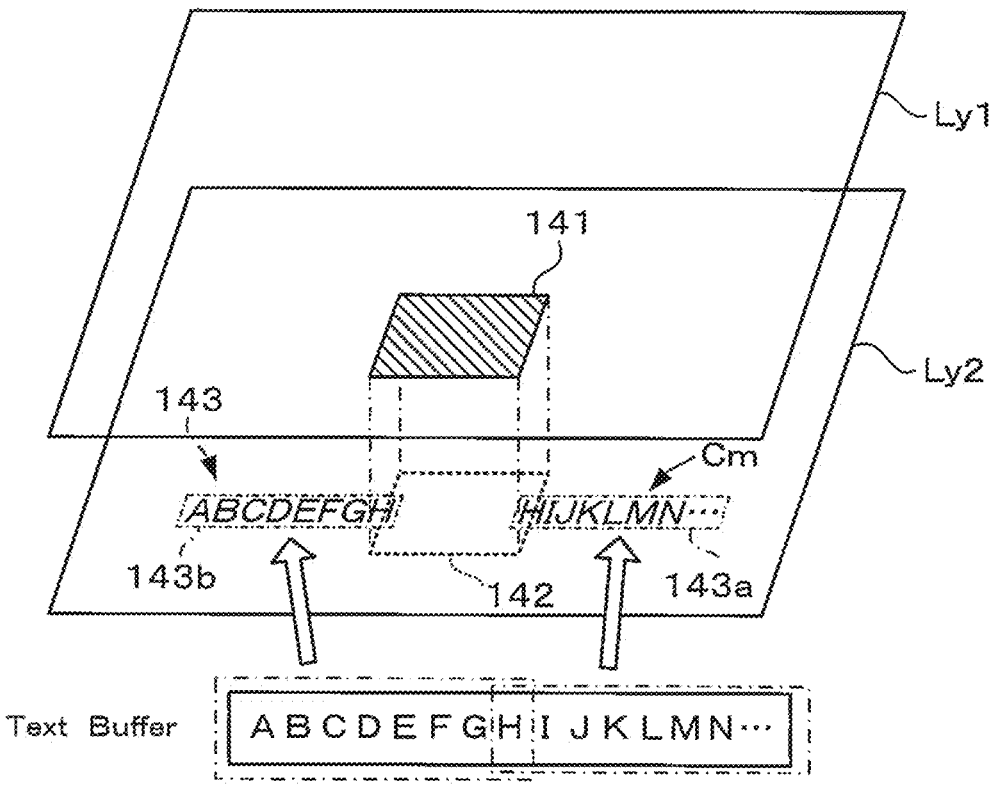
FIG. 18 is a diagram showing a method for drawing a comment according to FIG. 16.

FIG. 18 shows a method of drawing the comment Cm according to the second mode. In this case, as with the example shown in FIG. 17, the first and the second layers Ly1 and Ly2 are provided, and the display restricted area 121 is drawn on the first layer Ly1 as the mask portion 141 which is opaque. On the other hand, with respect to the second layer Ly2, though the comment Cm is drawn thereon as with the example of FIG. 17, the second mode is different from the example of FIG. 17 in the method of drawing the comment Cm. That is, on the second layer Ly2, a comment restricted area 142 corresponding to the display restricted area 121 and a comment drawn area 143 where the comment Cm should be drawn are set. The comment restricted area 142 are the substantially same as the mask portion 141. The comment drawn area 143 moves at a predetermined speed from the right end to the left end of the second layer Ly2 for realizing the movement of the comment Cm. When the left end of the comment drawn area 143 reaches the comment restricted area 142, the comment drawn area 143 is divided into a right field 143a and a left field 143b so that the comment restricted area 142 exists between the fields 143a and 143b. With respect to each of the fields 143a and 143b, the length in a horizontal direction changes by degrees depending on the moving speed of the comment Cm. That is, the right field 143a shortens by degrees appropriately for the moving speed, and the left field 143b elongates by degrees appropriately for the moving speed. Then, the right end of the right field 143a reaches the comment restricted area 142, the division made by the fields 143a and 143b is terminated and after that, the comment drawn area 143 moves leftward.

As mentioned above, while the comment drawn area 143 is divided into the field 143a and the field 143b, to each of the fields 143a and 143b, a letter string of the comment Cm is assigned in a range that the number of letters is appropriate for the length of each field. In the example shown in FIG. 18, within the letter string "ABCDEFGHIJK-LMN . . . " of the comment Cm, the letters from "A" to "H" are assigned to the left field 143b, and the letters from "H" to " . . . " are assigned to the right field 143a. The letter "H" is assigned to both of the fields 143a and 143b redundantly, in order to represent the situation that a part of letter "H" is erased at the right end of the mask portion 141 while the part appears at the left end. The letter string composing the comment Cm is held in a comment buffer prepared in the internal memory of the game controlling portion 31. Accordingly, by referring to the comment buffer, it is possible to recognize the length of the letter string, that is, the whole length of the comment drawn area 143.

As shown in FIG. 18, after the letter string of the comment Cm is assigned for the comment drawn area 143, as with the example of FIG. 17, by drawing the first layer Ly1 and the second layer Ly2 so as to overlap with each other according to the vertical relationship of them, it is possible to draw the image of the comment Cm according to the second mode shown in FIG. 16. Further, by setting, with respect to the image drawn in a state that the layers Ly1 and Ly2 are overlapped with each other, a part other than a color part of letters of the comment Cm as a transparent part, overlapping such image on the image where a competition state is drawn for the game screen 110, and drawing the images, it is possible to draw the game screen 110 where the comment Cm is overlapped with the image of the competition state as shown in FIG. 16

The configuration of the game system 1 in the second embodiment may be basically same as the configuration in the first embodiment. In the first embodiment, the comment is displayed one by one on the game machine 3 and a comment registered in advance can be replied to the comment displayed. However, in the game system of the second embodiment, the processing in step S415 of FIG. 12 may be changed so that each time the game machine 3 receives a comment transmitted to the user of the game machine 3, the comment is displayed immediately in the mode shown in FIG. 15 or FIG. 16. More specifically, the comment display controlling portion 36 shown in FIG. 6 may execute, as a sub-routine of step S415, the comment display control processing of FIG. 19 which is obtained by changing a part of processing of FIG. 13. The processing of FIG. 19 is executed individually for each of the plural comments to be displayed concurrently on the game screen 110.

Figure 19:
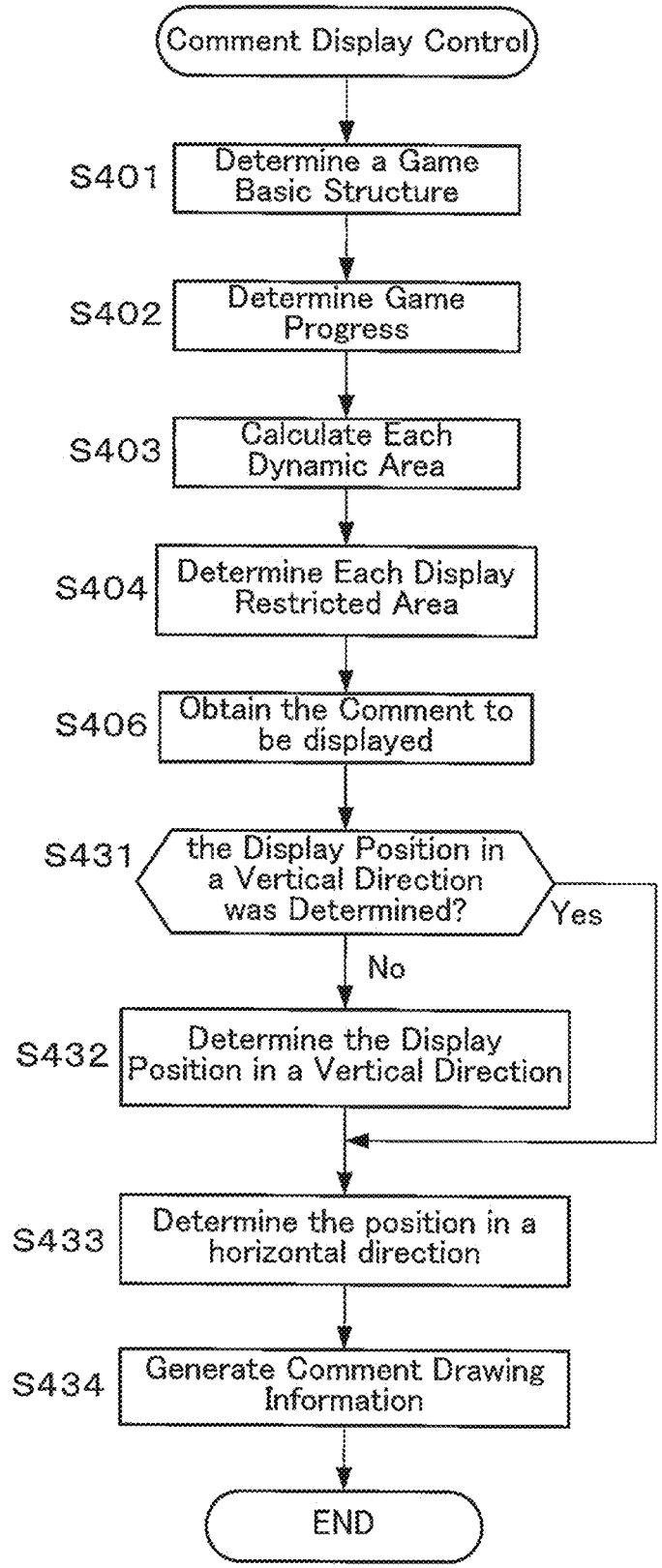
FIG. 19 is a flow chart showing procedures of comment display control processing in the second mode.

In the comment display control processing of FIG. 19, the processing of steps S401 to S404 is the same as the processing of the same steps of FIG. 13. After the position of the display restricted area 121 is determined in step S404, the comment display controlling portion 36 takes in the comment, a display object, to the comment drawing information generating portion 36c (step S406). The comment taken in this step is either a comment a part or a whole of which is being displayed on the game screen 110 or a comment the display of which should be started from the next drawing timing. Next, the comment display controlling portion 36 determines with respect to the comment which is the processing object (the comment taken in step S406 of the current time), whether the display position in a vertical direction of the game screen 110 has been already determined or not (step S431). That is, in the present embodiment, in order to make plural comments display on the game screen 110 so that each of the comments is separated from each other in a vertical direction, when there is a comment to be displayed newly, it is necessary to determine the display position of the comment with respect to a vertical direction of the game screen 110. After the position with respect to the vertical direction is determined once, the comment is moved by degrees from right to left while keeping its position with respect to the vertical direction. Then, in step S431, it is determined whether the comment which is the processing object is a comment which is displayed newly or not. In a case that the comment is not displayed newly, as the display position with respect to the vertical direction has been already determined, an affirmative determination is obtained.

When it is determined that the display position with respect to the vertical direction has not yet been determined in step S431, the comment display controlling portion 36 determines the display position with respect to the vertical direction for the comment which is the processing object of the current time, so that the comment is not overlapped with other comments (step S432). At this moment, the position which has as few display restricted areas as possible on the game screen 110 may be selected preferentially as the display position. After determining the display position with respect to the vertical direction, the comment display controlling portion 36 determines the position of the comment in a horizontal direction of the game screen 110 (step S433). For example, in a case of the first mode shown in FIG. 17, the position of the comment with respect to the horizontal direction may be determined based on elapsed time from the start moment of displaying the comment and the moving speed of the comment. In a case of the second embodiment shown in FIG. 18, in addition to the determination of the position of the comment with respect to the horizontal direction, it is determined whether the division of the comment drawn area 143 is needed or not. When it is needed, by the method mentioned above, the comment display controlling portion 36 generates the fields 143a and 143b and allocates the letter string of the comment to each of the fields 143a and 143b. When a negative determination is obtained in step S431, step S432 is skipped and step S433 is executed.

After the position of the comment on the game screen 110 is determined, the comment display controlling portion 36 makes the comment drawing information generating portion 36c generate the comment drawing information necessary to draw the comment obtained in step S406 on the game screen 110 (step S434). In this case, as the comment drawing information, the following information is output: the layers Ly1 and Ly2, which are generated according to the position of the comment with respect to the vertical direction and the position determined in step S433 for the comment, are overlapped as mentioned above, and further the part other than the letter string composing the comment is set so as to be transparent. With that, the comment display controlling portion 36 ends the processing of FIG. 19 of the current time. The comment drawing information generated in step S434 is outputted to the game screen drawing portion 34, and drawn by the game screen drawing portion 34 is the game screen 110 where the image according to the comment drawing information is overlapped with the image of the game according to the calculation result of the game calculating portion 33. Thereby, as shown in FIGS. 15 and 16, it is possible to display on the display device 38 the game screen 110 showing a state that the comment Cm moves from right to left on the display possible area 120. In the present embodiment, the function relating to a reply from the game machine 3 (the processing of FIGS. 9 and 14) may be omitted.

In the second embodiment mentioned above, the comment display controlling portion 36 of the game machine 3 functions as the comment display controlling device of the present invention. The basic structure determining portion 36a and the dynamic area calculating portion 36b of the comment display controlling portion 36 function as the area determining device of the present invention by executing steps S401 to S404 of FIG. 19. The comment drawing information generating portion 36c functions as the display restricting device of the present invention by executing steps S433 and S434 of FIG. 19.

The present invention is not only limited to the embodiments above mentioned, but also can be executed in various embodiments. For example, the processing for making a game apparatus display a comment transmitted from the other user, or the processing for making a game apparatus transmit a reply comment is not limited to the above example, and can be varied in various ways. For example, in the above embodiment, the transmitted comment and the received comment of each user are recorded in the comment data on the center server 2 side. However, the following system may be applied. The transmitted comment is stored on a terminal apparatus of a user, and only the received comment is recorded in the comment data. In the above example, the present invention is described using, as an example, so-called the pull-based delivery or the pseudo push-based delivery, where a comment which a user should receive is recorded once in the comment data on a server apparatus side, and a user terminal apparatus or a game machine refers to the comment as necessary. However, the system may be configured using the push-based delivery. Further, the data structure of each of the game-play data 51 and the community data 52 is only one example. The game-play data and the community data may be integrated, or further, a modification that each data is divided into data pieces and each data piece is associated with appropriate ID can be also applied.

In the embodiment mentioned above, the restriction in the situation that a comment transmitted from a user terminal apparatus is displayed on a game apparatus is described. However, the comment may be transmitted from the other game apparatus. Further, the other user who is a transmitter is not limited to an actual person. Even if a user virtually generated on a server apparatus or a game apparatus is a transmitter of a comment, to the display of the comment for an actual user on a game apparatus, the restriction of the present invention may be applied. Further, a comment is not limited to the one transmitted from an actual user or a virtual user. Various kinds of information which are displayed for the user on the game apparatus may be set as the comment of the present invention, and the display of the comment is also restricted by the present invention. Accordingly, the present invention is not only applied to a game system including a server apparatus, a game apparatus and a user terminal apparatus, but also applied to a game system including only a server apparatus and a game apparatus. Further, the present invention is also applied to a game system including only a game apparatus. A function of replying a comment from the game apparatus is not always necessary. The game apparatus is not only limited to a game machine for commercial use, or for business use, but also a static game machine for home use, a portable game machine, or a versatile computer terminal apparatus such as a PC or a portable phone can be used as the game apparatus.

In each mode mentioned above, the comment display is restricted by prohibiting a comment from being displayed in the display restricted area 121. However, the present invention is not limited to such a mode. For example, in the example shown in FIG. 15, the degree of transparency of a comment may be raised in the display restricted area, or the letters of the comment may be changed to outline letters in the display restricted area. In this way, by executing image processing for making image behind the comment conspicuous, the visibility of a part overlapped with the display restricted area in a comment can be made lower than the visibility of various display elements such as some objects or others to be displayed in the display restricted area. Thereby, by making the comment less noticeable in the display restricted area, it may be suppressed that the visibility of the game screen is lowered in the display restricted area. Even if a comment is displayed so as to avoid the display restricted area as shown in FIG. 16, the case is not limited to the example that the state of display position is changed so as to stride over the display restricted area. For example, the restriction that a comment is not displayed in the display restricted area may be realized by detouring the comment along the outer circumference of the display restricted area.

What is claimed is:

1. A game system: including a game apparatus which allows a user to play a game; and having a comment display controlling device which is configured to, when computer code is executed by a computer apparatus of the game apparatus, display a comment for the user on a game screen to be displayed according to a status of the game, the comment moving along a predetermined movement route on the game screen, the comment display controlling device being provided with:

an area determining device which is configured to, when computer code is executed by the computer apparatus, determine a display restricted area where display of the comment in the game screen is restricted;

a display restricting device which is configured to, when computer code is executed by the computer apparatus, apply a predetermined restriction to the display of the comment in the display restricted area; and a device which is configured to move the comment from one end to another end of the movement route provided on the game screen in such a way as to pass through at least one of the display restricted area, wherein the display restricting device is configured to when the comment being moved along the movement route by the device configured to move the comment reaches the display restricted area, apply the predetermined restriction to the display of a portion of the comment, the portion overlapping with the display restricted area, and release the predetermined restriction from the portion having passed through the display restricted area.

2. The game system according to claim 1, wherein the display restricted area includes a dynamic area where a shape or a size of the dynamic area is changed according to the status of the game, and the area determining device is configured to determine the dynamic area based on the status of the game.

3. The game system according to claim 1, wherein the display restricting device is configured to make visibility of a part where the comment is overlapped with the display restricted area lower than visibility of another display element to be displayed on the display restricted area, to apply the predetermined restriction.

4. The game system according to claim 3, wherein the display restricting device is configured so as not to display the part where the comment is overlapped with the display restricted area on the game screen, to apply the predetermined restriction.

5. The game system according to claim 1, wherein the display restricting device is configured to control the display of the comment so that the comment moves avoiding the display restricted area, to apply the predetermined restriction.

6. The game system according to claim 1, wherein the comment is a comment transmitted to the user of the game apparatus from another user.

7. A comment display control method applied to a game system including a game apparatus which has a computer apparatus and allows a user to play a game, the comment display control method for controlling the computer apparatus to display a comment for the user on a game screen to be displayed according to a status of the game, the comment moving along a predetermined movement route on the game screen, including:

an area determining step of determining a display restricted area where display of the comment on the game screen is restricted;

a display restricting step of applying a predetermined restriction to the display of the comment in the display restricted area; and a comment moving step of moving the comment from one end to another end of the movement route provided on the game screen in such a way as to pass through at least one of the display restricted area, wherein the display restricting step, when the comment being moved along the movement route by the device configured to move the comment reaches the display restricted area, includes the steps of applying the predetermined restriction to the display of a portion of the comment, the portion overlapping with the display restricted area, and releasing the predetermined restriction from the portion having passed through the display restricted area.

8. A non-transitory computer program readable storage medium storing a computer program, the computer program being applied to a game system including a game apparatus which allows a user to play a game, and making a computer apparatus of the game apparatus function as a comment display controlling device which is configured to display on the game apparatus, a comment for the user on a game screen to be displayed according to a status of the game, the comment moving along a predetermined movement route on the game screen, wherein the computer program has computer code to make the computer apparatus function as the comment display controlling device being provided with:

an area determining device which is configured to, when the computer code is executed by the computer apparatus, determine a display restricted area where display of the comment on the game screen is restricted;

a display restricting device which is configured to, when the computer code is executed by the computer apparatus, apply a predetermined restriction to the display of the comment in the display restricted area; and a device which is configured to move the comment from one end to another end of the movement route provided on the game screen in such a way as to pass through at least one of the display restricted area, wherein the display restricting device is configured to, when the comment being moved along the movement route by the device configured to move the comment reaches the display restricted area, apply the predetermined restriction to the display of a portion of the comment, the portion overlapping with the display restricted area, and release the predetermined restriction from the portion having passed through the display restricted area.

* * * * *